United States Patent
Islam et al.

(10) Patent No.: US 10,278,145 B2
(45) Date of Patent: Apr. 30, 2019

(54) COMMUNICATION OF UPLINK CONTROL INFORMATION

(71) Applicant: QUALCOMM Incorporated, San Diego, CA (US)

(72) Inventors: Muhammad Nazmul Islam, Edison, NJ (US); Sundar Subramanian, Bridgewater, NJ (US); Juergen Cezanne, Ocean Township, NJ (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 123 days.

(21) Appl. No.: 15/224,122

(22) Filed: Jul. 29, 2016

(65) Prior Publication Data

US 2017/0245230 A1    Aug. 24, 2017

Related U.S. Application Data

(60) Provisional application No. 62/297,861, filed on Feb. 20, 2016.

(51) Int. Cl.
*H04W 56/00*      (2009.01)
*H04W 74/08*      (2009.01)
(Continued)

(52) U.S. Cl.
CPC ...... *H04W 56/0005* (2013.01); *H04B 7/0617* (2013.01); *H04L 5/0053* (2013.01);
(Continued)

(58) Field of Classification Search
CPC ......... H04W 56/0005; H04W 72/0446; H04W 74/00; H04W 74/0833; H04W 56/00; H04W 56/001; H04W 72/1284
See application file for complete search history.

(56) References Cited

U.S. PATENT DOCUMENTS 9,001,780 B2   4/2015   Chen et al.
2008/0089312 A1*   4/2008   Malladi ................. H04L 5/005
                                                    370/345
(Continued)

FOREIGN PATENT DOCUMENTS

WO   WO-2015167286 A1   11/2015
WO   WO-2016015350 A1   2/2016
(Continued)

OTHER PUBLICATIONS

International Search Report and Written Opinion—PCT/US2017/017838—ISA/EPO—May 24, 2017.

*Primary Examiner* — Mohamed A Kamara
(74) *Attorney, Agent, or Firm* — Loza & Loza, LLP

(57) ABSTRACT

Various aspects of the disclosure relate to communicating random access information and uplink control information. In some aspects, a user equipment (UE) or other suitable apparatus transmits physical uplink control channel (PUCCH) information concurrently with random access channel (RACH) information transmitted by another UE or other apparatus. For example, the RACH access information and the PUCCH information may be frequency division multiplexed orthogonal tones. The disclosure relates in some aspects to using downlink-uplink (DL-UL) channel reciprocity to determine symbol and/or tone locations. For example, a base station or other suitable apparatus may initially sweep across different directions in different time slots to transmit directional primary synchronization signals (DPSSs). A UE or other suitable apparatus can then find an appropriate RACH symbol from its best DPSS beam index and transmit PUCCH information in those symbols.

37 Claims, 23 Drawing Sheets

(51) Int. Cl.
*H04L 27/26* (2006.01)
*H04B 7/06* (2006.01)
*H04L 5/00* (2006.01)

(52) U.S. Cl.
CPC ........ H04L 5/0094 (2013.01); H04L 27/2613 (2013.01); H04L 27/2646 (2013.01); H04W 74/0833 (2013.01); H04L 5/0007 (2013.01); H04L 27/2666 (2013.01); H04L 27/2675 (2013.01)

(56) References Cited

U.S. PATENT DOCUMENTS

| | | | |
|---|---|---|---|
| 2009/0111445 A1* | 4/2009 | Ratasuk | H04B 7/2662 455/418 |
| 2010/0142475 A1* | 6/2010 | Kim | H04L 5/0053 370/329 |
| 2014/0233445 A1 | 8/2014 | Yang et al. | |
| 2015/0036566 A1 | 2/2015 | Blankenship et al. | |
| 2015/0208404 A1 | 7/2015 | Yie et al. | |
| 2015/0282155 A1 | 10/2015 | Webb et al. | |
| 2016/0164642 A1* | 6/2016 | Lee | H04W 72/0406 370/280 |
| 2016/0165631 A1* | 6/2016 | Gao | H04L 5/001 370/336 |

FOREIGN PATENT DOCUMENTS

| | | | |
|---|---|---|---|
| WO | WO-2016021963 A1 | | 2/2016 |
| WO | WO 2016210302 A1 * | | 12/2016 |

\* cited by examiner

COMMUNICATION OF UPLINK CONTROL INFORMATION

CROSS-REFERENCE TO RELATED APPLICATION(S)

This application claims priority to and the benefit of provisional patent application No. 62/297,861 filed in the U.S. Patent and Trademark Office on Feb. 20, 2016, the entire content of which is incorporated herein by reference.

INTRODUCTION

Various aspects described herein relate to wireless communication and, more particularly but not exclusively, to communicating uplink control information.

In some multiple access wireless communication systems, several devices communicate with a base station (BS). In some scenarios, the base station is equipped with multiple transmit antennas and multiple receive antennas. One example is a millimeter wave (mmW) system where multiple antennas are used for beamforming (e.g., in the range of 30 GHz, 60 GHz, etc.). Such a base station may communicate with the devices in a time-division-multiplexing (TDM) or time-division-duplexing (TDD) manner. That is, the base station transmits to a first device in a first time interval and then to a second device subsequently in a second time interval. Often, the beamforming directions to these two devices are distinct. As a result, the base station may change its beamforming setting from the first time interval to the second time interval.

FIG. 1 illustrates a communication system 100 where a mmW base station 102 communicates with a first mmW user equipment (UE) 104 and a second mmW UE 106 via different beamforming directions. As indicated by a set of beams 108, the mmW base station 102 may communicate via any one of a plural of directional beams. As indicated by a set of beams 110, the first mmW UE 104 may communicate via any one of a plural of directional beams. As indicated by a set of beams 112, the second mmW UE 106 may communicate via any one of a plural of directional beams. Thus, at a given point in time, the base station 102 may communicate with the first mmW UE 104 via a first beamforming direction 114 and communicate with the second mmW UE 106 via a second beamforming direction 116.

In millimeter wave systems, a directional random access channel (DRACH) may be used for initial network access. A base station may sweep across different directions in different time slots and wait to receive DRACH signals from UEs. DRACH signals may occupy a narrower bandwidth and have a longer duration than other signals. For example, the DRACH signals may occupy an inner portion of the total available bandwidth. Consequently, the system link budget may be unnecessarily high.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory device and a processing circuit coupled to the memory device. The processing circuit is configured to: communicate directed primary synchronization signals; determine timing for communication of uplink control information, wherein the determination of the timing is based on the directed primary synchronization signals; and communicate the uplink control information at the determined timing.

Another aspect of the disclosure provides a method for communication including: communicating directed primary synchronization signals; determining timing for communication of uplink control information, wherein the determination of the timing is based on the directed primary synchronization signals; and communicating the uplink control information at the determined timing.

Another aspect of the disclosure provides an apparatus configured for communication. The apparatus including: means for communicating directed primary synchronization signals; means for determining timing for communication of uplink control information, wherein the determination of the timing is based on the directed primary synchronization signals; and means for communicating the uplink control information at the determined timing.

Another aspect of the disclosure provides a non-transitory computer-readable medium storing computer-executable code, including code to: communicate directed primary synchronization signals; determine timing for communication of uplink control information, wherein the determination of the timing is based on the directed primary synchronization signals; and communicate the uplink control information at the determined timing.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

In some aspects, the disclosure relates to using bandwidth (e.g., outer bandwidth) that is otherwise unused during DRACH transmission for the transmission of physical uplink control channel (PUCCH) information. PUCCH may include, for example, channel quality information (CQI), a scheduling request (SR), a precoding matrix indicator (PMI), or other information. The disclosure relates to transmission of physical uplink control channel (PUCCH) information concurrently with random access channel (RACH) information. For example, different UEs may transmit the RACH access information and the PUCCH information as frequency division multiplexed orthogonal tones.

In some aspects, the disclosure relates to determining timing (e.g., symbol locations) and/or tone locations based on directional primary synchronization signals (DPSSs). A base station may initially sweep across different directions in different time slots to transmit DPSSs. Using downlink-uplink (DL-UL) channel reciprocity, UEs can find the appropriate RACH symbol from their best DPSS beam index and transmit PUCCH information in those symbols. In some implementations, a given UE can determine the tone location of its PUCCH transmission during DRACH symbols from the UE's ID. In some implementations, a given UE can determine the tone location of its PUCCH transmission during DRACH symbols from explicit scheduling information received from the base station.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure. The teachings herein can be implemented according to various network technologies including, without limitation, fifth generation (5G) technology, fourth generation (4G) technology, third generation (3G) technology, and other network architectures. Thus, various aspects of the disclosure may be extended to networks based on 3rd Generation Partnership Project (3GPP) Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system. For purposes of illustration, the following may describe various aspects in the context of an LTE system. It should be appreciated, however, that the teachings herein may be employed in other systems as well.

Figure 1:
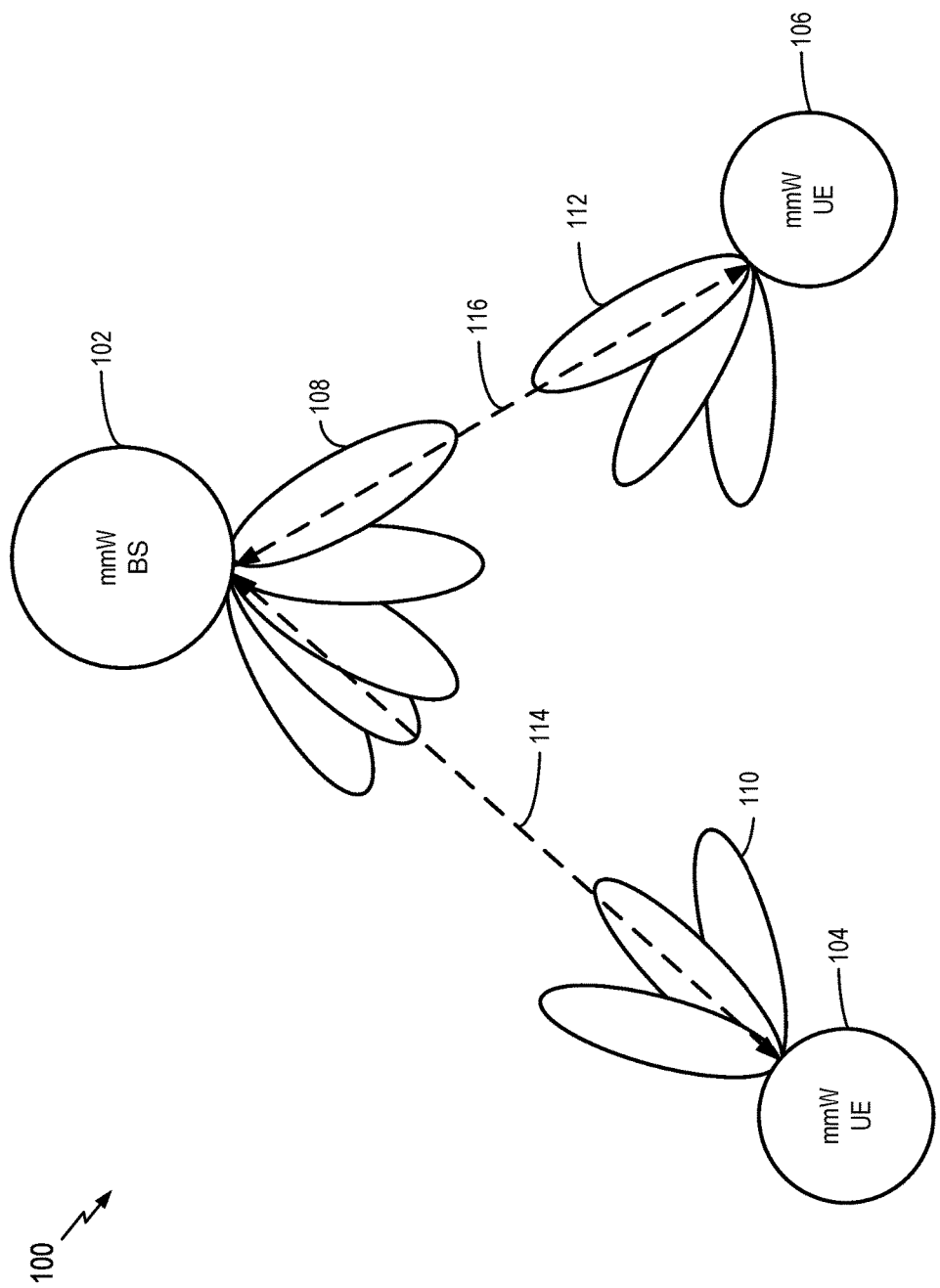
FIG. 1 is a diagram of an example communication system employing beamforming.
Figure 2:
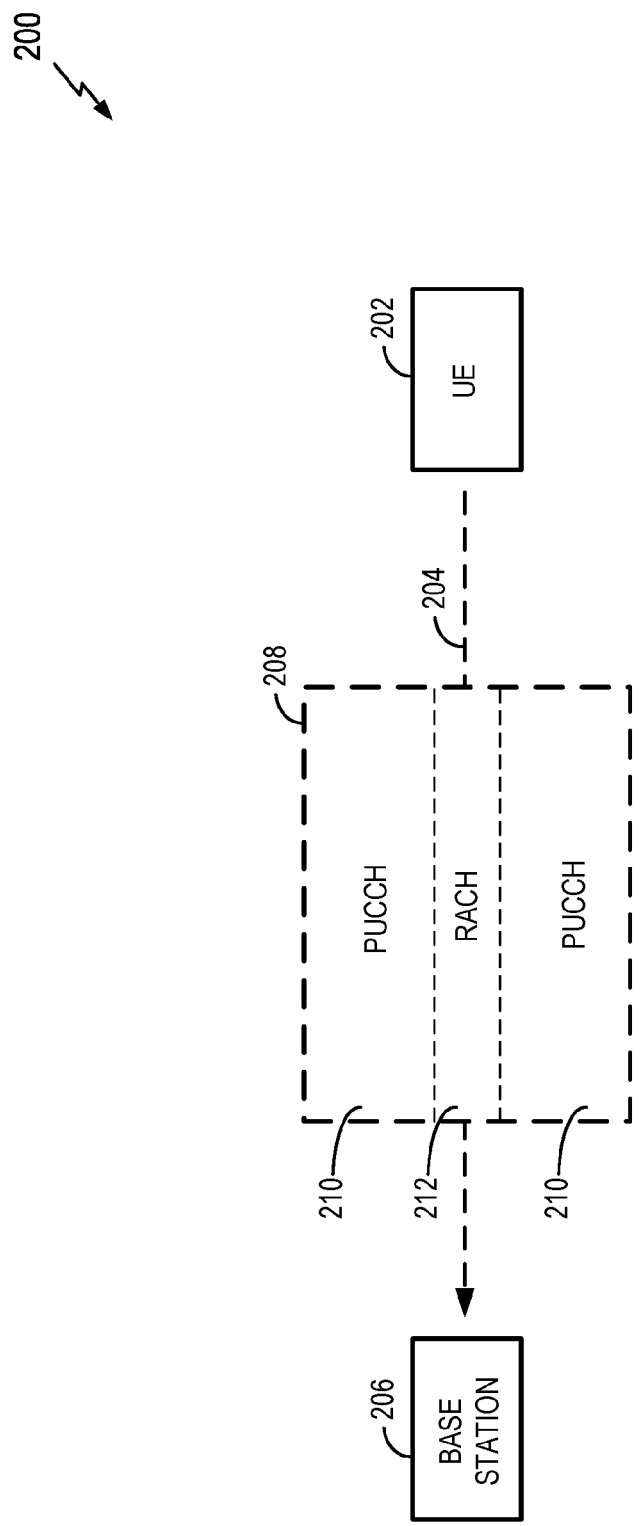
FIG. 2 is a diagram of an example communication system employing random access channel (RACH) and physical uplink control channel (PUCCH) communication in accordance with some aspects of the disclosure.

FIG. 2 illustrates a communication system 200 where a UE 202 sends uplink information 204 to a base station 206. In some implementations, the UE 202 and the base station 206 may include mmW functionality as in the UEs 104 and 106 and the base station 102 of FIG. 1, respectively.

As represented by a time (x axis) and frequency (y axis) resource block 208 in FIG. 2, PUCCH information 210 (e.g., sent by a first UE) may be sent concurrently with RACH information 212 (e.g., sent by a second UE). In this example, the PUCCH information 210 is sent via bandwidth that is outside of the central bandwidth used to send the RACH information 212. It should be appreciated, however, that in other implementations control information such as PUCCH information need not be sent concurrently with RACH information.

Synchronization Signaling

In an example implementation, Zadoff-Chu (ZC) sequences may be used for synchronization (e.g., a primary synchronization signal, PSS) and access (e.g., a random access channel, RACH). The RACH waveform may span several (e.g., greater than 8) symbols to overcome the relatively smaller equivalent isotropically radiated power (EIRP) of the UE (e.g., the UE 202 of FIG. 2). To enable the UE to learn useful transmit/receive (Tx/Rx) beam pairs and to overcome high pathloss, beamforming may be used on Rx and Tx. These beamformed PSS and RACH signals may be referred to as DPSS (Directed PSS) and DRACH (Directed RACH), respectively.

Figure 3:
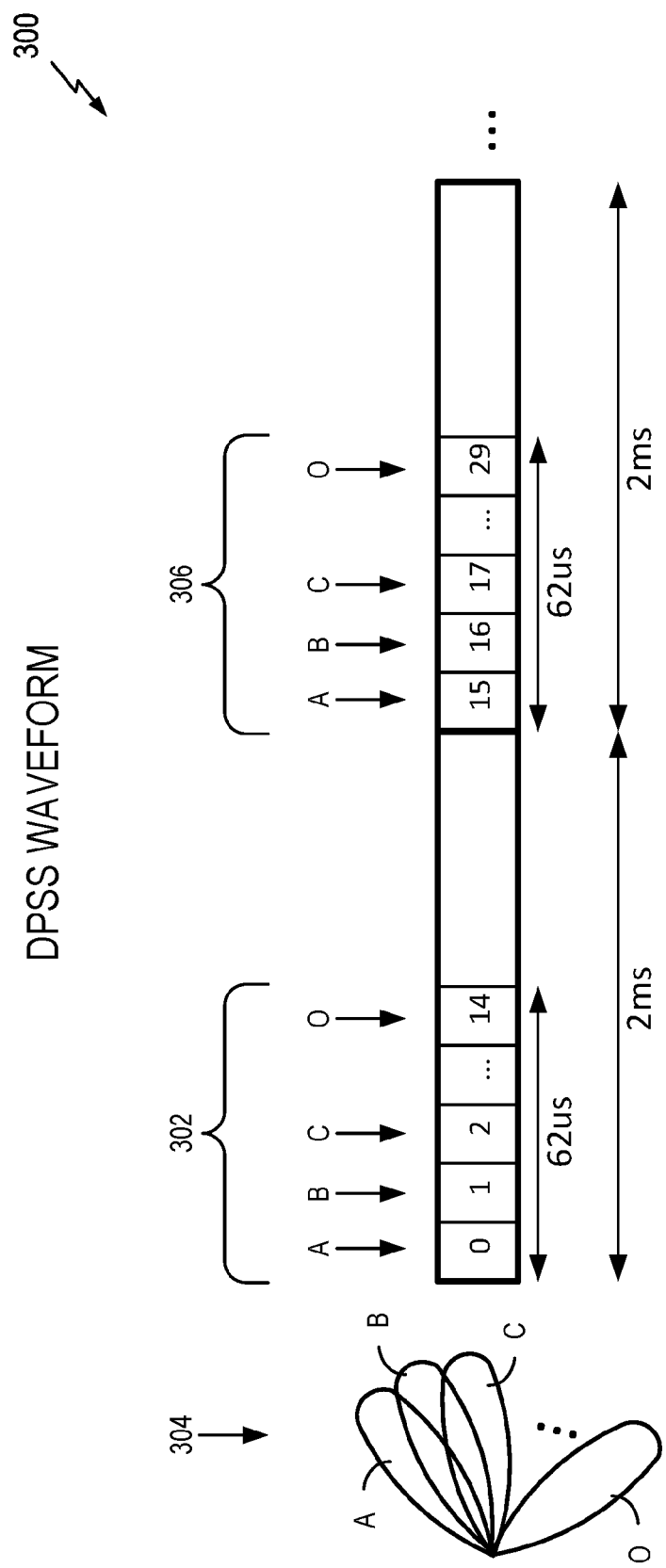
FIG. 3 is a diagram of an example of a DPSS waveform in accordance with some aspects of the disclosure.

FIG. 3 illustrates an example of a waveform 300 for a DPSS. A mmW base station (MWB) such the base station 206 of FIG. 2 sends out DPSS on several successive symbols 302. As represented by the beams 304, the symbols are sent in different directions A, B, C, . . . O sweeping through the entire sector. In the example of FIG. 3, the DPSS sweep consumes 15 successive symbols and is repeated (e.g., via the symbols 306) every 2 milliseconds.

Synchronization and Access Signaling

Figure 4:
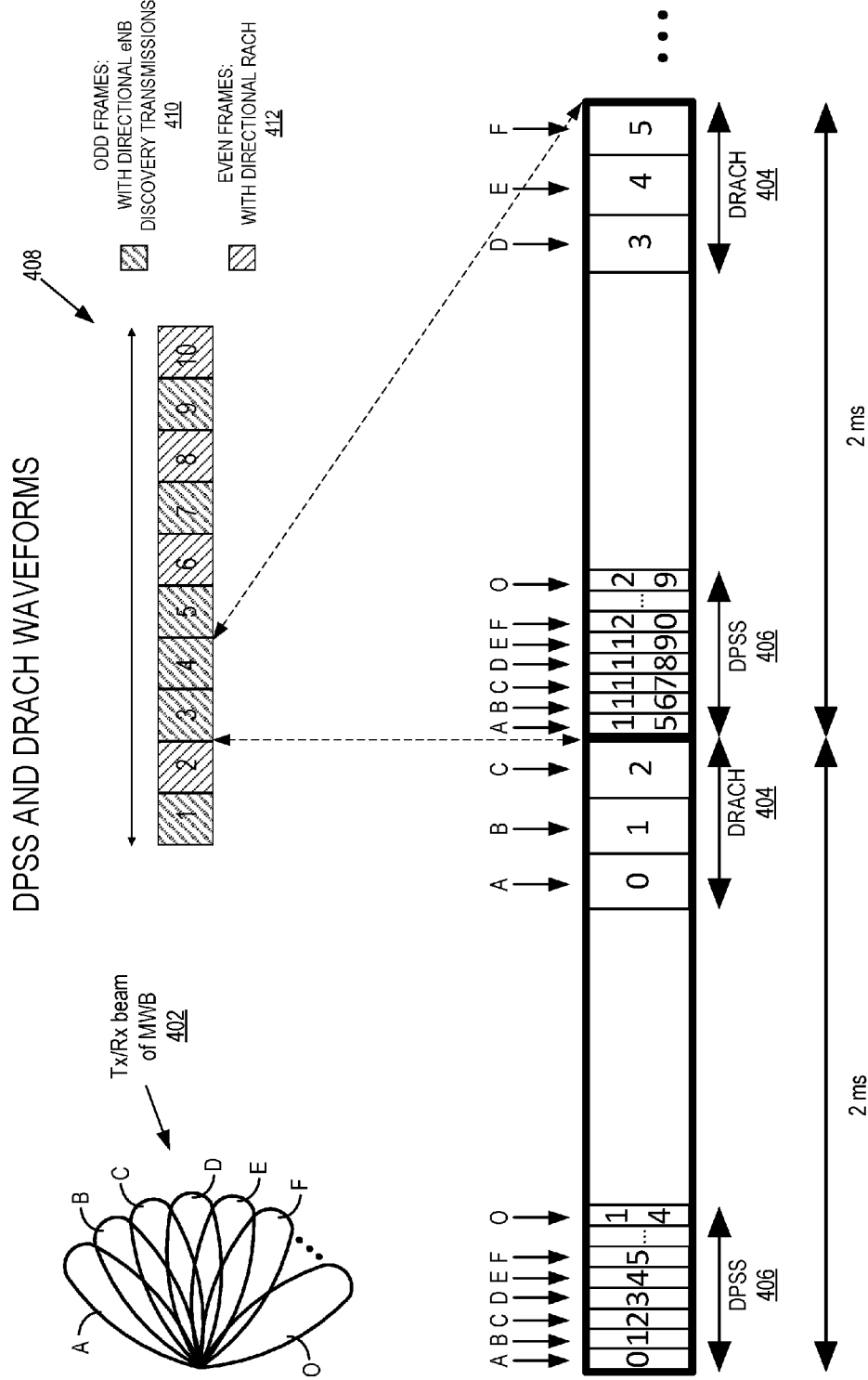
FIG. 4 is a diagram of an example of DPSS and DRACH waveforms in accordance with some aspects of the disclosure.

FIG. 4 illustrates an example of synchronization between MWB beams 402 for DPSS and DRACH. The MWB (e.g., the base station 206 of FIG. 2) receives DRACH 404 using beam patterns which are the same or similar to those used for transmitting DPSS 406. The MWB sweeps the entire sector as represented by the MWB beams 402. As indicated by the frame representation 408, some frames 410 may be used for directional eNode B (eNB) discovery transmissions, while other frames 412 may be used for directional RACH.

In some implementations, the duration of a DRACH symbol is eight times the duration of a DPSS symbol. In this case, the bandwidth used for the DRACH signal is ⅛th the bandwidth used for the DPSS signal. As a result, there is additional bandwidth available outside the DRACH band. In one scenario, within 10 milliseconds there is a DRACH opportunity for every UE.

As discussed herein, the Tx-beams for the DPSS and the Rx-beams for DRACH may be synchronized. Using reciprocity, a UE knows from the best beam found during DPSS reception, at which DRACH symbol it should send the access symbol. Thus, the base station Rx beam pattern (for DRACH)=the base station Tx pattern (for DPSS) as indicated by the letter designations A-O in FIG. 4.

DRACH Location

Figure 5:
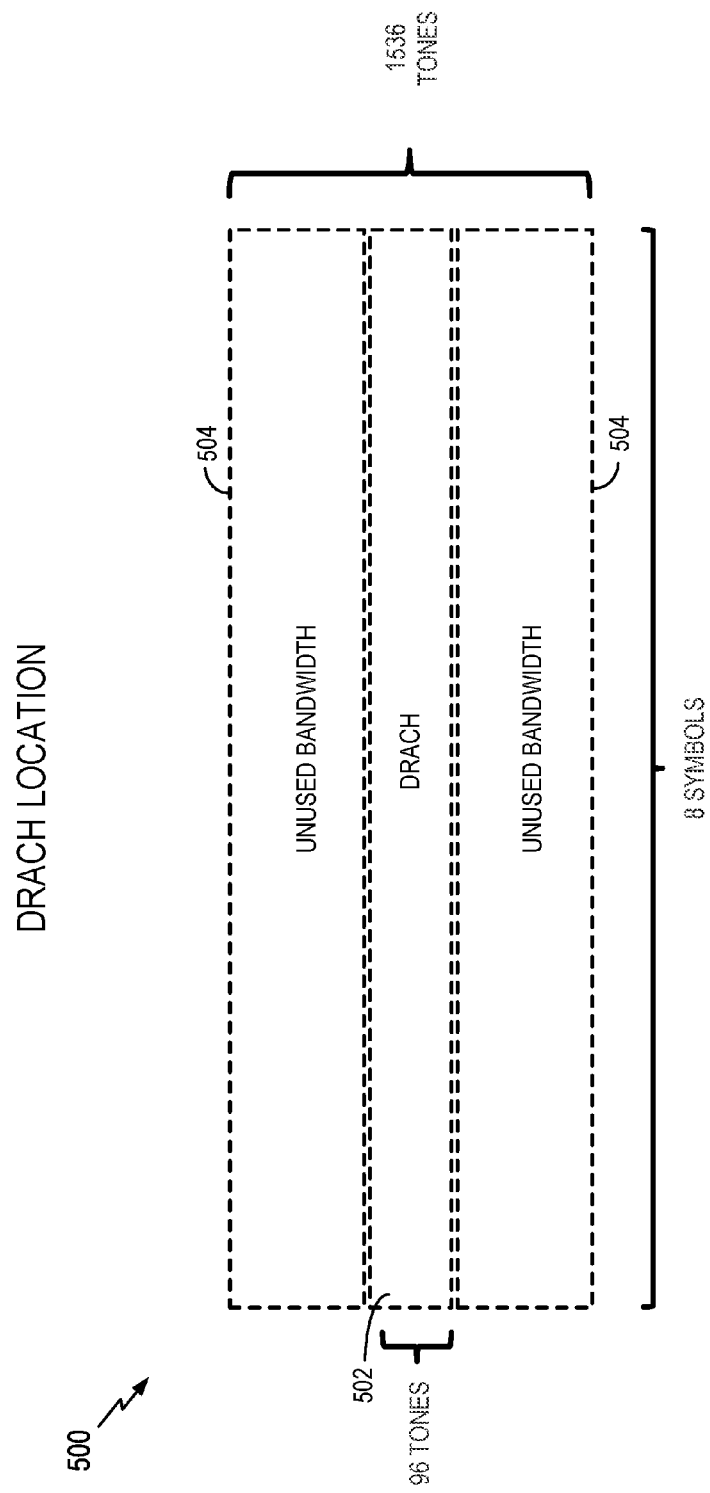
FIG. 5 is a diagram of an example of a DRACH location in accordance with some aspects of the disclosure.

FIG. 5 illustrates an example of a DRACH location within an example bandwidth allocation 500. If the total system bandwidth is 500 MHz, the bandwidth may contain 1536 usable tones (fast Fourier transform (FFT) size=2048). It should be appreciated that other bandwidths may be applicable to other scenarios.

As one example, a DPSS may be transmitted at a central frequency of 250 MHz. Note, however, that some UEs might not have 250 MHz bandwidth capability.

DRACH may use ⅛th of the DPSS band as discussed above. Thus, DRACH may use 31.25 MHz (e.g., 96 tones) as indicated by the region 502 in FIG. 5. As indicated by the regions 504 in FIG. 5, the outer bands remain unused during DRACH in this example.

PUCCH Tone Locations

Figure 6:
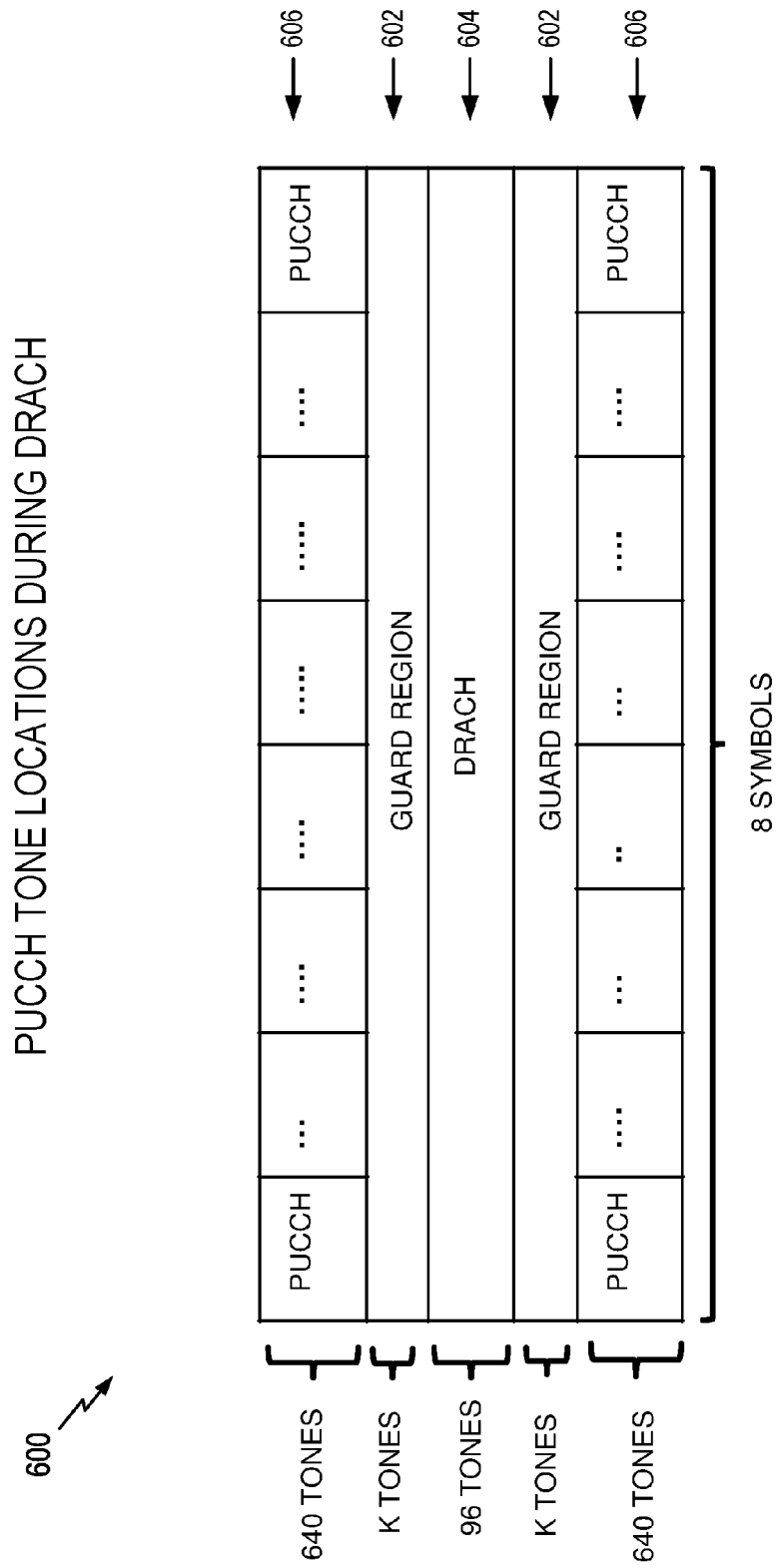
FIG. 6 is a diagram of an example of PUCCH tone locations in accordance with some aspects of the disclosure.

FIG. 6 illustrates a resource allocation 600 with an example of PUCCH tone locations that may be used during DRACH in accordance with the teachings herein. In this example, K tones 602 are used as guard regions on both sides of the DRACH region 604. The remaining tones (1536-2K-96 tones) are used for the PUCCH regions 606. In some scenarios, the UEs (e.g., the UE 202 of FIG. 2) may send channel quality information (CQI), preceding matrix information, and a scheduling request (SR) in the PUCCH regions 606.

CQI Structure

Figure 7:
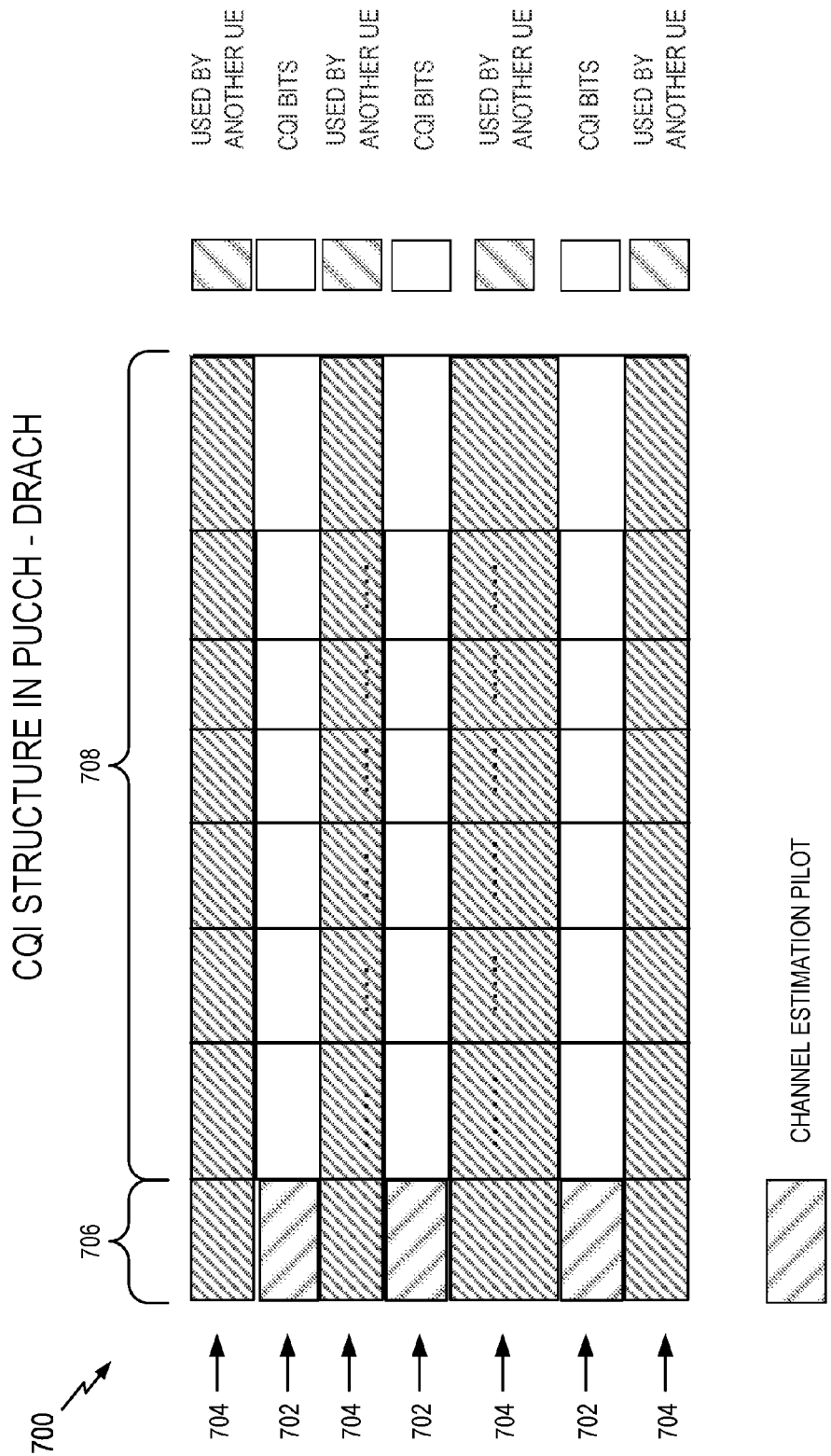
FIG. 7 is a diagram of an example of a channel quality information (CQI) structure in accordance with some aspects of the disclosure.

FIG. 7 illustrates an example of a CQI structure 700 that may be used in a PUCCH-DRACH scheme as taught herein. In this example, 18 tones are used in eight symbols (x axis). Tones are interleaved. One set of tones 702 is used by a UE (e.g., the UE 202 of FIG. 2). Other sets of tones 704 are used by other UEs. The first symbol 706 transmits two sets of the ZC(1,9) sequence (e.g., a channel estimation pilot). The next seven symbols 708 transmit CQI with two sets of Reed Solomon [9, 3, 7] code in GF(16). There may be 8 information bits per symbol codeword and 4 parity bits. Thus, in this example, there may be 112 (8*2*7) bits of CQI feedback during DRACH-PUCCH. Other CQI structures could be used in other implementations.

UEs that face 1-4 dB DL signal-to-noise ratio (SNR) might transmit only one set of ZC and RS sequences. For example, these UEs could transmit 56 (8*7) CQI bits in total during DRACH-PUCCH. Other UEs (e.g., with good SNR) may use more tones (e.g., 6 sub-bands instead of 3 sub-bands).

In other implementations, a given UE may use fewer than eight symbols in a given frame (e.g., different symbols in the frame could be allocated to different UEs). In this case, a UE may know which symbol to use based on the beam index associated with the DPSS. For example, the best beam found during the DPSS search could be identified and a corresponding beam used for the DRACH-PUCCH. Moreover, there may be a 1:1 mapping (or some other relationship) between beams and symbols. For example, beam A may be mapped to symbol 1, beam B mapped to symbol 2, and so on. Thus, the identification of a particular beam may indicate a particular symbol to use.

The particular symbols to be used for the DRACH-PUCCH could be identified by other means as discussed herein. For example, a base station may explicitly tell a UE which symbols to use. As another example, a UE may use its identifier (ID) to determine which symbols to use (e.g., based on a known mapping between UE IDs and symbol locations).

Cyclic Shift

In some scenarios, multiple UEs could transmit in the same set of subcarriers and the same set of symbol locations. To reduce interference between the signals of these UEs, cyclic shifting could be employed for the sequences (e.g., ZC sequences) used by the UEs in those sets of subcarriers. Thus, a given UE (e.g., the UE 202 of FIG. 2) may use a particular cyclic shift when transmitting signals for the DRACH-PUCCH. To this end, a base station (e.g., the base station 206 of FIG. 2) may send an indication of the particular cyclic shift that a UE is to use.

Other Aspects

In view of the above, in some aspects, UEs may transmit physical uplink control channel information (PUCCH) to the base station during periods that are reserved for DRACH. In some aspects, the PUCCH may constitute channel quality information, precoding matrix information, a scheduling request, and ACK/NAK information. In some aspects, PUCCH and DRACH may be transmitted in frequency division multiplex (FDMed) orthogonal tones. In some aspects, the UEs may hear DPSS from the base station and determine the symbol locations and/or tone locations where the UEs should transmit PUCCH. In some aspects, the base station may explicitly inform UEs the symbol and/or tone locations where the UEs should transmit PUCCH. In some aspects, the UEs may use their ID to determine the symbol locations and/or tone locations where the UEs should transmit PUCCH (e.g., based on a known mapping between UE IDs and symbol locations and/or tone locations).

First Example Apparatus

Figure 8:
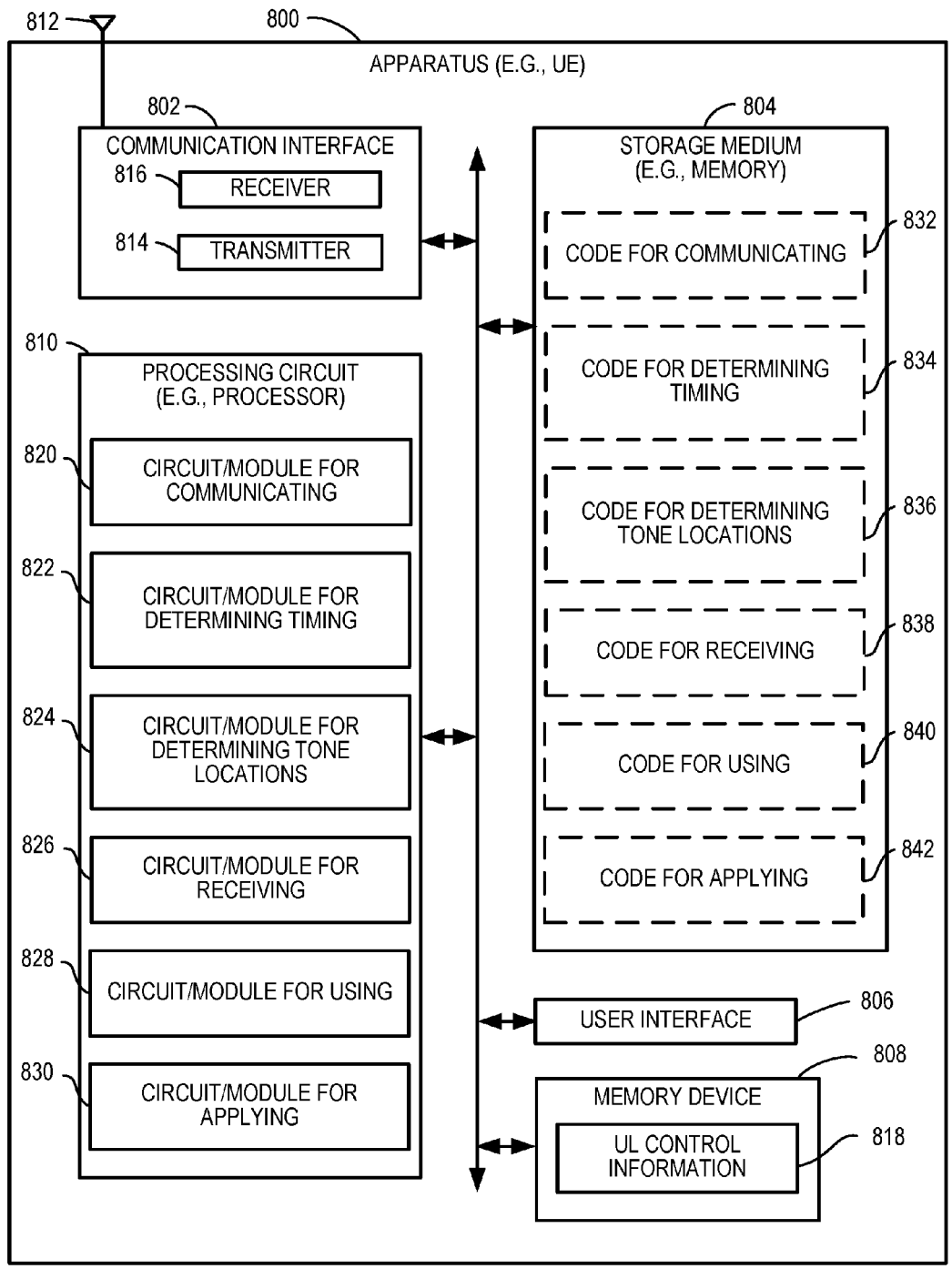
FIG. 8 is a block diagram illustrating an example hardware implementation for an apparatus (e.g., an electronic device) that can support communication in accordance with some aspects of the disclosure.

FIG. 8 illustrates a block diagram of an example hardware implementation of an apparatus 800 configured to communicate according to one or more aspects of the disclosure. The apparatus 800 could embody or be implemented within a UE, a base station, or some other type of device that supports wireless communication. In various implementations, the apparatus 800 could embody or be implemented within an access terminal, an access point, or some other type of device. In various implementations, the apparatus 800 could embody or be implemented within a mobile phone, a smart phone, a tablet, a portable computer, a server, a personal computer, a sensor, an entertainment device, a medical device, or any other electronic device having circuitry.

The apparatus 800 includes a communication interface 802 (e.g., at least one transceiver), a storage medium 804 (e.g., a memory device), a user interface 806, a memory device 808 (e.g., a memory circuit), and a processing circuit 810 (e.g., at least one processor). In various implementations, the user interface 806 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 8. The signaling bus may include any number of interconnecting buses and bridges depending on the specific application of the processing circuit 810 and the overall design constraints. The signaling bus links together various circuits such that each of the communication interface 802, the storage medium 804, the user interface 806, and the memory device 808 are coupled to and/or in electrical communication with the processing circuit 810. The signaling bus may also link various other circuits (not shown) such as timing sources, peripherals, voltage regulators, and power management circuits, which are well known in the art, and therefore, will not be described any further.

The communication interface 802 provides a means for communicating with other apparatuses over a transmission medium. In some implementations, the communication interface 802 includes circuitry and/or programming adapted to facilitate the communication of information bi-directionally with respect to one or more communication devices in a network. In some implementations, the communication interface 802 is adapted to facilitate wireless communication of the apparatus 800. In these implementations, the communication interface 802 may be coupled to one or more antennas 812 as shown in FIG. 8 for wireless communication within a wireless communication system. The communication interface 802 can be configured with one or more standalone receivers and/or transmitters, as well as one or more transceivers. In the illustrated example, the communication interface 802 includes a transmitter 814 and a receiver 816. The communication interface 802 serves as one example of a means for receiving and/or means transmitting.

The memory device 808 may represent one or more memory devices. As indicated, the memory device 808 may maintain uplink control information 818 along with other information used by the apparatus 800. In some implementations, the memory device 808 and the storage medium 804 are implemented as a common memory component. The memory device 808 may also be used for storing data that is manipulated by the processing circuit 810 or some other component of the apparatus 800.

The storage medium 804 may represent one or more computer-readable, machine-readable, and/or processor-readable devices for storing programming, such as processor executable code or instructions (e.g., software, firmware), electronic data, databases, or other digital information. The storage medium 804 may also be used for storing data that is manipulated by the processing circuit 810 when executing programming. The storage medium 804 may be any available media that can be accessed by a general purpose or special purpose processor, including portable or fixed storage devices, optical storage devices, and various other mediums capable of storing, containing or carrying programming.

By way of example and not limitation, the storage medium 804 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 804 may be embodied in an article of manufacture (e.g., a computer program product). By way of example, a computer program product may include a computer-readable medium in packaging materials. In view of the above, in some implementations, the storage medium 804 may be a non-transitory (e.g., tangible) storage medium.

The storage medium 804 may be coupled to the processing circuit 810 such that the processing circuit 810 can read information from, and write information to, the storage medium 804. That is, the storage medium 804 can be coupled to the processing circuit 810 so that the storage medium 804 is at least accessible by the processing circuit 810, including examples where at least one storage medium is integral to the processing circuit 810 and/or examples where at least one storage medium is separate from the processing circuit 810 (e.g., resident in the apparatus 800, external to the apparatus 800, distributed across multiple entities, etc.).

Programming stored by the storage medium 804, when executed by the processing circuit 810, causes the processing circuit 810 to perform one or more of the various functions and/or process operations described herein. For example, the storage medium 804 may include operations configured for regulating operations at one or more hardware blocks of the processing circuit 810, as well as to utilize the communication interface 802 for wireless communication utilizing their respective communication protocols.

The processing circuit 810 is generally adapted for processing, including the execution of such programming stored on the storage medium 804. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 810 is arranged to obtain, process and/or send data, control data access and storage, issue commands, and control other desired operations. The processing circuit 810 may include circuitry configured to implement desired programming provided by appropriate media in at least one example. For example, the processing circuit 810 may be implemented as one or more processors, one or more controllers, and/or other structure configured to execute executable programming. Examples of the processing circuit 810 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 810 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 810 are for illustration and other suitable configurations within the scope of the disclosure are also contemplated.

According to one or more aspects of the disclosure, the processing circuit 810 may be adapted to perform any or all of the features, processes, functions, operations and/or routines for any or all of the apparatuses described herein. For example, the processing circuit 810 may be configured to perform any of the steps, functions, and/or processes described with respect to FIGS. 9-14. As used herein, the term "adapted" in relation to the processing circuit 810 may refer to the processing circuit 810 being one or more of configured, employed, implemented, and/or programmed to perform a particular process, function, operation and/or routine according to various features described herein.

The processing circuit 810 may be a specialized processor, such as an application specific integrated circuit (ASIC) that serves as a means for (e.g., structure for) carrying out any one of the operations described in conjunction with FIGS. 9-14. The processing circuit 810 serves as one example of a means for transmitting and/or a means for receiving. In various implementations, the processing circuit 810 may incorporate the functionality of the UE 202 of FIG. 2.

According to at least one example of the apparatus 800, the processing circuit 810 may include one or more of a circuit/module for communicating 820, a circuit/module for determining timing 822, a circuit/module for determining tone locations 824, a circuit/module for receiving 826, a circuit/module for using 828, or a circuit/module for applying 830. In various implementations, the circuit/module for communicating 820, the circuit/module for determining timing 822, the circuit/module for determining tone locations 824, the circuit/module for receiving 826, the circuit/module for using 828, or the circuit/module for applying 830 may correspond, at least in part, to the functionality of the UE 202 of FIG. 2.

As mentioned above, programming stored by the storage medium 804, when executed by the processing circuit 810, causes the processing circuit 810 to perform one or more of the various functions and/or process operations described herein. For example, the programming, when executed by the processing circuit 810, may cause the processing circuit 810 to perform the various functions, steps, and/or processes described herein with respect to FIGS. 9-14 in various implementations. As shown in FIG. 8, the storage medium 804 may include one or more of code for communicating 832, code for determining timing 834, code for determining tone locations 836, code for receiving 838, code for using 840, or code for applying 842. In various implementations, the code for communicating 832, the code for determining timing 834, the code for determining tone locations 836, the code for receiving 838, the code for using 840, or the code for applying 842 may be executed or otherwise used to provide the functionality described herein for the circuit/module for communicating 820, the circuit/module for determining timing 822, the circuit/module for determining tone locations 824, the circuit/module for receiving 826, the circuit/module for using 828, or the circuit/module for applying 830, respectively.

The circuit/module for communicating 820 may include circuitry and/or programming (e.g., code for communicating 832 stored on the storage medium 804) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 820 may communicate (e.g., receive) directed primary synchronization signals. In some aspects, the circuit/module for communicating 820 may communicate (e.g., send) uplink control information (e.g., at particular symbol locations during a frame and/or at particular tone locations during a frame). In some aspects, the circuit/module for communicating 820 may communicate (e.g., send) random access information (e.g., via a frame). In some aspects, the circuit/module for communicating 820 may communicate (e.g., receive) an indication of tone locations. In some aspects, the circuit/module for communicating 820 may communicate (e.g., receive) an indication of timing (e.g., symbol locations). In some aspects, the circuit/module for communicating 820 may communicate (e.g., receive) an indication of a cyclic shift. In some aspects, the circuit/module for communicating 820 may communicate (e.g., receive) an identifier of user equipment.

In some implementation, the circuit/module for communicating 820 may use one or more parameters for the communicating. For example, the circuit/module for communicating 820 may obtain information about timing (e.g., symbol locations) and/or tone locations and communicate (e.g., send) information at those locations. As another example, the circuit/module for communicating 820 may obtain information about a cyclic shift and then use that cyclic shift when communicating (e.g., sending) information.

In some implementations where the communicating involves receiving information, the circuit/module for communicating 820 receives information (e.g., from the communication interface 802, the receiver 816, the memory device 808, some other component of the apparatus 800, or some other device), processes (e.g., decodes) the information, and outputs the information to another component of the apparatus 800 (e.g., the memory device 808 or some other component). In some scenarios (e.g., if the circuit/module for communicating 820 includes a receiver), the communicating involves the circuit/module for communicating 820 receiving information directly from a device that transmitted the information (e.g., via radio frequency signaling or some other type of signaling suitable for the applicable communication medium).

In some implementations where the communicating involves sending information, the circuit/module for communicating 820 obtains information (e.g., from the memory device 808 or some other component of the apparatus 800), processes (e.g., encodes) the information, and outputs the processed information. In some scenarios, the communicating involves sending the information to another component of the apparatus 800 (e.g., the transmitter 814, the communication interface 802, or some other component) that will transmit the information to another device. In some scenarios (e.g., if the circuit/module for communicating 820 includes a transmitter), the communicating involves the circuit/module for communicating 820 transmitting the information directly to another device (e.g., the ultimate destination) via radio frequency signaling or some other type of signaling suitable for the applicable communication medium.

In some implementations, the circuit/module for communicating 820 is a transceiver. In some implementations, the circuit/module for communicating 820 is a receiver. In some implementations, the circuit/module for communicating 820 is a transmitter. In some implementations, the communication interface 802 includes the circuit/module for communicating 820 and/or the code for communicating 832. In some implementations, the circuit/module for communicating 820 and/or the code for communicating 832 is configured to control the communication interface 802 (e.g., a transceiver, a receiver, or a transmitter) to communicate the information.

The circuit/module for determining timing 822 may include circuitry and/or programming (e.g., code for determining timing 834 stored on the storage medium 804) adapted to perform several functions relating to, for example, determining timing for communication of uplink control information. In some aspects, the determined timing may be used to send uplink control information. In some aspects, the determined timing may denote at least one of: a symbol index, a sub-frame index, a radio frame index, or any combination thereof. In some aspects, the determined timing may include symbol locations.

In some implementations, the circuit/module for determining timing 822 performs the operations that follow if the determination of the timing is based on directed primary synchronization signals. In this case, the circuit/module for determining timing 822 obtains information about the directed primary synchronization signals (e.g., from the circuit/module for communicating 820, the memory device 808, the communication interface 802, the receiver 816, or some other component). For example, the circuit/module for determining timing 822 may obtain information as discussed herein in conjunction with FIG. 3 and/or FIG. 4. The circuit/module for determining timing 822 may then identify the timing (e.g., symbol locations) to be used for communication based on the obtained information (e.g., as discussed herein in conjunction with FIG. 3 and/or FIG. 4). For example, the circuit/module for determining timing 822 may identify the best beam or best beams and then identify (e.g., based on a mapping) the timing (e.g., a symbol location or symbol locations) associated with each identified beam. The circuit/module for determining timing 822 outputs an indication of the determined timing (e.g., to the circuit/module for communicating 820, the memory device 808, the communication interface 802, the transmitter 814, or some other component).

In some implementations, the circuit/module for determining timing 822 performs the operations that follow if the determination of the timing (e.g., symbol locations) is based on an identifier of a user equipment. In this case, the circuit/module for determining timing 822 obtains the identifier (e.g., from the circuit/module for communicating 820, the memory device 808, the communication interface 802, the receiver 816, or some other component). The circuit/module for determining timing 822 then uses an identifier-to-timing mapping (e.g., in the form of a table, an algorithm, or some other suitable mapping) to identify the timing (e.g., symbol location or locations) associated with that identifier. The circuit/module for determining timing 822 then outputs an indication of the determined timing (e.g., to the circuit/module for communicating 820, the memory device 808, the communication interface 802, the transmitter 814, or some other component).

The circuit/module for determining tone locations 824 may include circuitry and/or programming (e.g., code for determining tone locations 836 stored on the storage medium 804) adapted to perform several functions relating to, for example, determining tone locations for communication of uplink control information within a frame. In some aspects, the determined tone locations may be used to send uplink control information.

In some implementations, the circuit/module for determining tone locations 824 performs the operations that follow if the determination of the tone locations is based on directed primary synchronization signals. In this case, the circuit/module for determining tone locations 824 obtains information about the directed primary synchronization signals (e.g., from the circuit/module for communicating 820, the memory device 808, the communication interface 802, the receiver 816, or some other component). For example, the circuit/module for determining tone locations 824 may obtain information as discussed herein in conjunction with FIG. 3 and/or FIG. 4. The circuit/module for determining tone locations 824 may then identify the tone locations to be used for communication based on the obtained information (e.g., in a similar manner as discussed herein in conjunction with FIG. 3 and/or FIG. 4). For example, the circuit/module for determining tone locations 824 may identify the best beam or beams and then identify (e.g., based on a mapping) the tone location associated with those beams. The circuit/module for determining tone locations 824 outputs an indication of the determined tone locations (e.g., to the circuit/module for communicating 820, the memory device 808, the communication interface 802, the transmitter 814, or some other component).

In some implementations, the circuit/module for determining tone locations 824 performs the operations that follow if the determination of the tone locations is based on an identifier of a user equipment. In this case, the circuit/module for determining tone locations 824 obtains the identifier (e.g., from the circuit/module for communicating 820, the memory device 808, the communication interface 802, the receiver 816, or some other component). The circuit/module for determining tone locations 824 then uses an identifier-to-tone location mapping (e.g., in the form of a table, an algorithm, or some other suitable mapping) to identify the tone location or locations associated with that identifier. The circuit/module for determining tone locations 824 then outputs an indication of the determined tone locations (e.g., to the circuit/module for communicating 820, the memory device 808, the communication interface 802, the transmitter 814, or some other component).

The circuit/module for receiving 826 may include circuitry and/or programming (e.g., code for receiving 838 stored on the storage medium 804) adapted to perform several functions relating to, for example, receiving information. In some implementations, the circuit/module for receiving 826 performs the operations that follow. The circuit/module for receiving 826 obtains information (e.g., from the communication interface 802, the receiver 816, the memory device 808, some other component of the apparatus 800, or some other device), processes (e.g., decodes) the information, and outputs the information to another component of the apparatus 800 (e.g., the memory device 808 or some other component). In some scenarios (e.g., if the circuit/module for receiving 826 includes a receiver), the circuit/module for receiving 826 receives information directly from a device that transmitted the information (e.g., via radio frequency signaling or some other type of signaling suitable for the applicable communication medium).

The received information may take different forms in different scenarios. In some aspects, the circuit/module for receiving 826 may receive an indication of tone locations. In some aspects, the circuit/module for receiving 826 may receive an indication of timing (e.g., symbol locations). In some aspects, the circuit/module for receiving 826 may receive an indication of a cyclic shift. In some aspects, the circuit/module for receiving 826 may receive an identifier of user equipment.

In some implementations, the circuit/module for receiving 826 is or includes a receiver. In some implementations, the communication interface 802 includes the circuit/module for receiving 826 and/or the code for receiving 838. In some implementations, the circuit/module for receiving 826 and/or the code for receiving 838 is configured to control the communication interface 802 (e.g., a transceiver or a receiver) to receive the information.

The circuit/module for using 828 may include circuitry and/or programming (e.g., code for using 840 stored on the storage medium 804) adapted to perform several functions relating to, for example, using tone locations to transmit information. In some aspects, the information includes uplink control information.

In some implementations, the circuit/module for using 828 performs the operations that follow. The circuit/module for using 828 obtains an indication of the tone locations (e.g., from the circuit/module for receiving 826, the communication interface 802, the receiver 816, the memory device 808, or some other component of the apparatus 800). The circuit/module for using 828 encodes information to be transmitted so that the transmitted information is sent via these tone locations (e.g., by upconverting signals). The circuit/module for using 828 then causes the information to be transmitted. In some scenarios, the circuit/module for using 828 sends the information to another component of the apparatus 800 (e.g., the transmitter 814, the communication interface 802, or some other component) that will transmit the information to another device. In some scenarios (e.g., if the circuit/module for using 828 includes a transmitter), the circuit/module for circuit/module for using 828 transmits the information directly to another device (e.g., the ultimate destination) via radio frequency signaling or some other type of signaling suitable for the applicable communication medium.

In some implementations, the circuit/module for using 828 is or includes a transmitter. In some implementations, the communication interface 802 includes the circuit/module for using 828 and/or the code for using 840. In some implementations, the circuit/module for using 828 and/or the code for using 840 is configured to control the communication interface 802 (e.g., a transceiver or a transmitter) to send the information.

The circuit/module for applying 830 may include circuitry and/or programming (e.g., code for applying 842 stored on the storage medium 804) adapted to perform several functions relating to, for example, applying a cyclic shift during the transmission of information. In some aspects, the information includes uplink control information.

In some implementations, the circuit/module for applying 830 performs the operations that follow. The circuit/module for applying 830 obtains an indication of the cyclic shift (e.g., from the circuit/module for receiving 826, the communication interface 802, the receiver 816, the memory device 808, or some other component of the apparatus 800). The circuit/module for applying 830 encodes information to be transmitted so that the transmitted information is sent using the cyclic shift. The circuit/module for applying 830 then causes the information to be transmitted. In some scenarios, the circuit/module for applying 830 sends the information to another component of the apparatus 800 (e.g., the transmitter 814, the communication interface 802, or some other component) that will transmit the information to another device. In some scenarios (e.g., if the circuit/module for applying 830 includes a transmitter), the circuit/module for circuit/module for applying 830 transmits the information directly to another device (e.g., the ultimate destination) via radio frequency signaling or some other type of signaling suitable for the applicable communication medium.

In some implementations, the circuit/module for applying 830 is or includes a transmitter. In some implementations, the communication interface 802 includes the circuit/module for applying 830 and/or the code for applying 842. In some implementations, the circuit/module for applying 830 and/or the code for applying 842 is configured to control the communication interface 802 (e.g., a transceiver or a transmitter) to send the information.

First Example Process

Figure 9:
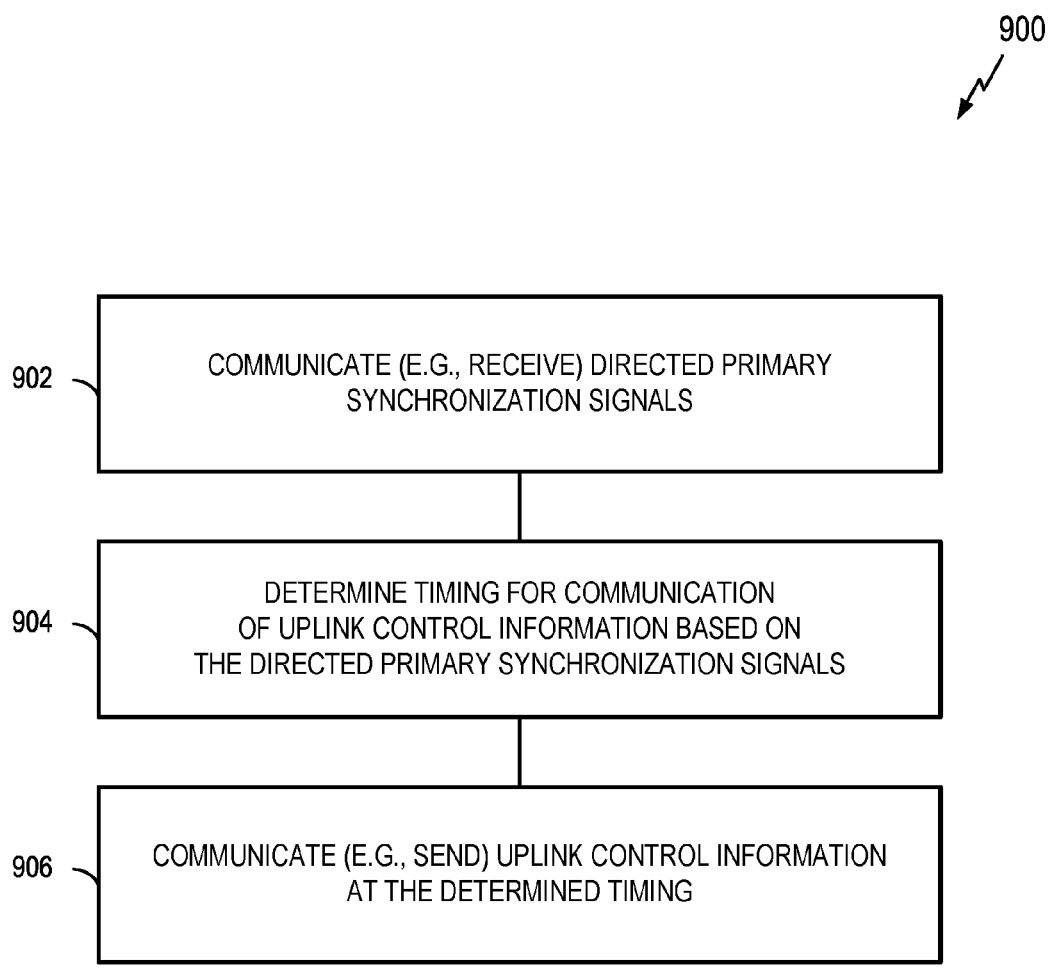
FIG. 9 is a flowchart illustrating an example of a process for communicating uplink control information in accordance with some aspects of the disclosure.

FIG. 9 illustrates a process 900 for communication in accordance with some aspects of the disclosure. The process 900 may take place within a processing circuit (e.g., the processing circuit 810 of FIG. 8), which may be located in a UE, a base station, or some other suitable apparatus. Of course, in various aspects within the scope of the disclosure, the process 900 may be implemented by any suitable apparatus capable of supporting communication-related operations.

At block 902, an apparatus (e.g., a UE) communicates (e.g., receives) directed primary synchronization signals. For example, a UE may receive directed primary synchronization signals from an eNB or some other device (e.g., a base station, etc.).

In some implementations, the circuit/module for receiving 826 or the circuit/module for communicating 820 of FIG. 8 performs the operations of block 902. In some implementations, the code for receiving 838 or the code for communicating 832 of FIG. 8 is executed to perform the operations of block 902.

At block 904, the apparatus determines timing for communication (e.g., transmission) of uplink control information. In some aspects, this determination may be based on the directed primary synchronization signals received at block 902. In some aspects, the determined timing may denote at least one of: a symbol index, a sub-frame index, a radio frame index, or any combination thereof. In some aspects, the determined timing may include symbol locations (e.g., within a frame).

In some implementations, the circuit/module for determining timing 822 of FIG. 8 performs the operations of block 904. In some implementations, the code for determining timing 834 of FIG. 8 is executed to perform the operations of block 904.

At block 906, the apparatus communicates (e.g., sends) the uplink control information at the determined timing (e.g., at a designated symbol index, sub-frame index, radio frame index, or some combination thereof). In some aspects, the uplink control information may include physical uplink control channel (PUCCH) information. In some aspects, the uplink control information may include scheduling request information. In some aspects, the uplink control information may include at least one of: channel quality information, precoding matrix information, a scheduling request, acknowledgement information, or any combination thereof.

In some aspects, the communication of the uplink control information involves transmitting the uplink control information by a user equipment. For example, a UE may transmit the uplink control information to an eNB via symbol locations determined at block 904.

In some implementations, the circuit/module for communicating 820 of FIG. 8 performs the operations of block 906. In some implementations, the code for communicating 832 of FIG. 8 is executed to perform the operations of block 906.

Second Example Process

Figure 10:
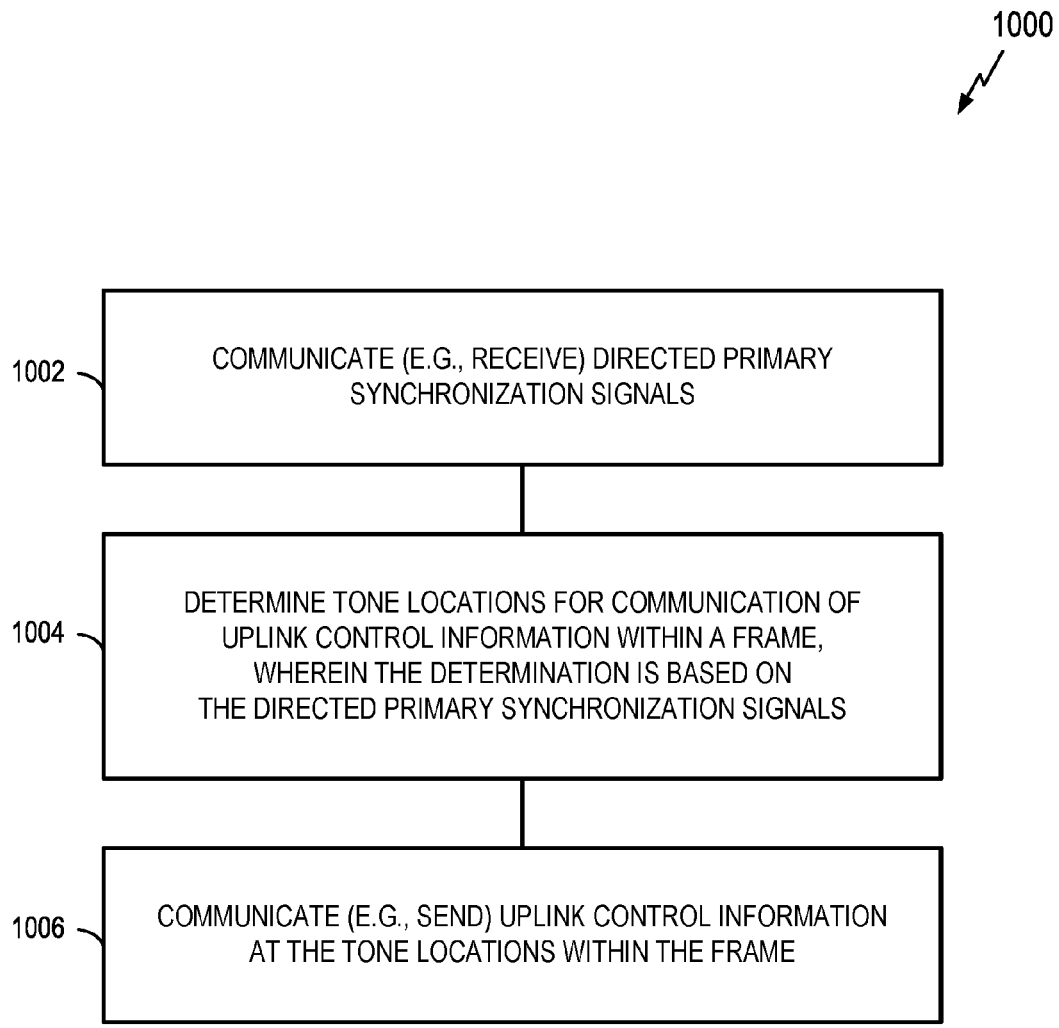
FIG. 10 is a flowchart illustrating an example of a process for determining locations within a frame in accordance with some aspects of the disclosure.

FIG. 10 illustrates a process 1000 for communication in accordance with some aspects of the disclosure. In some aspects, the process 1000 may be performed in conjunction with (e.g., as part of or in addition to) the process 900 of FIG. 9. The process 1000 may take place within a processing circuit (e.g., the processing circuit 810 of FIG. 8), which may be located in a UE, a base station, or some other suitable apparatus. Of course, in various aspects within the scope of the disclosure, the process 1000 may be implemented by any suitable apparatus capable of supporting communication-related operations.

At block 1002, an apparatus (e.g., a UE) communicates (e.g., receives) directed primary synchronization signals (e.g., from a base station). In some aspects, the operations of block 1002 may correspond to the operations of block 902 of FIG. 9.

In some implementations, the circuit/module for receiving 826 or the circuit/module for communicating 820 of FIG. 8 performs the operations of block 1002. In some implementations, the code for receiving 838 or the code for communicating 832 of FIG. 8 is executed to perform the operations of block 1002.

At block 1004, the apparatus determines tone locations for the communication (e.g., the transmission) of the uplink control information within a frame. In some aspects, this determination may be based on the directed primary synchronization signals received at block 1002.

In some implementations, the circuit/module for determining tone locations 824 of FIG. 8 performs the operations of block 1004. In some implementations, the code for determining tone locations 836 of FIG. 8 is executed to perform the operations of block 1004.

At block 1006, the apparatus communicates (e.g., sends) the uplink control information at the tone locations with the frame. For example, a UE may transmit the uplink control information to an eNB via the tone locations determined at block 1004.

In some implementations, the circuit/module for communicating 820 of FIG. 8 performs the operations of block 1006. In some implementations, the code for communicating 832 of FIG. 8 is executed to perform the operations of block 1006.

Third Example Process

Figure 11:
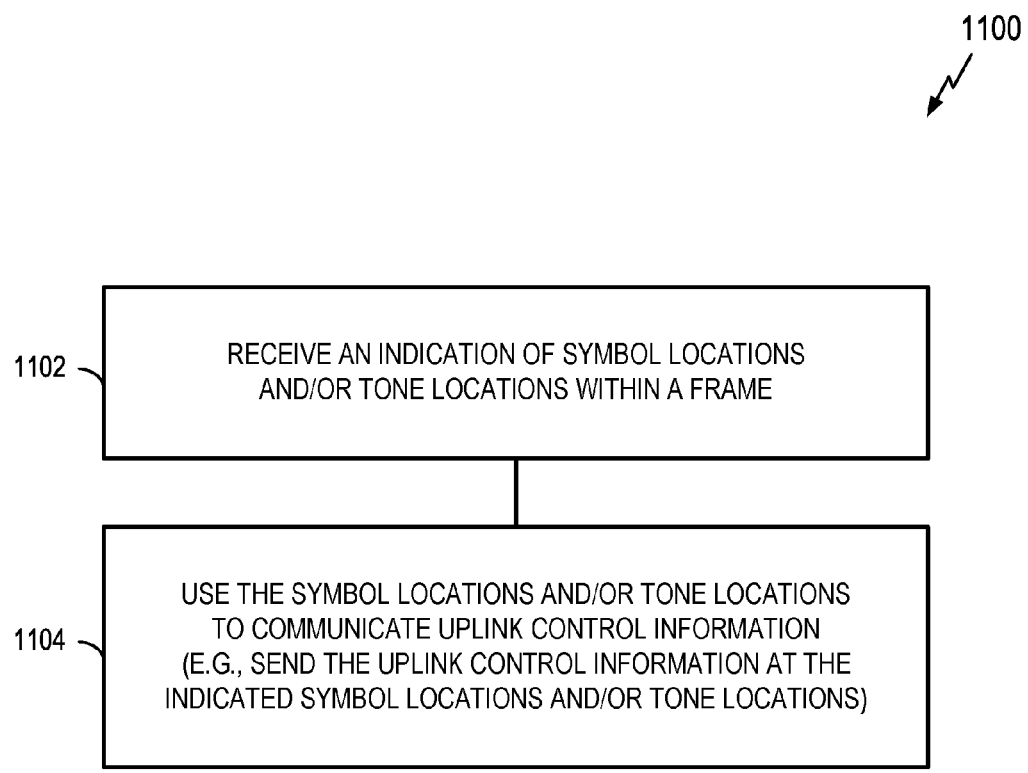
FIG. 11 is a flowchart illustrating an example of another process for communicating uplink control information in accordance with some aspects of the disclosure.

FIG. 11 illustrates a process 1100 for communication in accordance with some aspects of the disclosure. In some aspects, the process 1100 may be performed in conjunction with (e.g., as part of or in addition to) the process 900 of FIG. 9. The process 1100 may take place within a processing circuit (e.g., the processing circuit 810 of FIG. 8), which may be located in a UE, a base station, or some other suitable apparatus. Of course, in various aspects within the scope of the disclosure, the process 1100 may be implemented by any suitable apparatus capable of supporting communication-related operations.

At block 1102, an apparatus (e.g., a UE) receives an indication of symbol locations and/or tone locations within a frame (e.g., from a base station). For example, a UE may receive from an eNB an indication of tone locations to be used for communication (e.g., transmission) of uplink control information. Alternatively or in addition, a UE may receive from an eNB an indication of symbol locations (e.g., in addition to symbol locations determined at block 904) to be used for communication (e.g., transmission) of uplink control information.

In some implementations, the circuit/module for receiving 826 or the circuit/module for communicating 820 of FIG. 8 performs the operations of block 1102. In some implementations, the code for receiving 838 or the code for communicating 832 of FIG. 8 is executed to perform the operations of block 1102.

At block 1104, the apparatus uses the symbol locations and/or tone locations from block 1102 to communicate (e.g., send) uplink control information. For example, a UE may send (e.g., transmit) uplink control information at the tone locations indicated at block 1102. Alternatively or in addition, a UE may send (e.g., transmit) uplink control information at the symbol locations indicated at block 1102.

In some implementations, the circuit/module for using 828 or the circuit/module for communicating 820 of FIG. 8 performs the operations of block 1104. In some implementations, the code for using 840 or the code for communicating 832 of FIG. 8 is executed to perform the operations of block 1104.

Fourth Example Process

Figure 12:
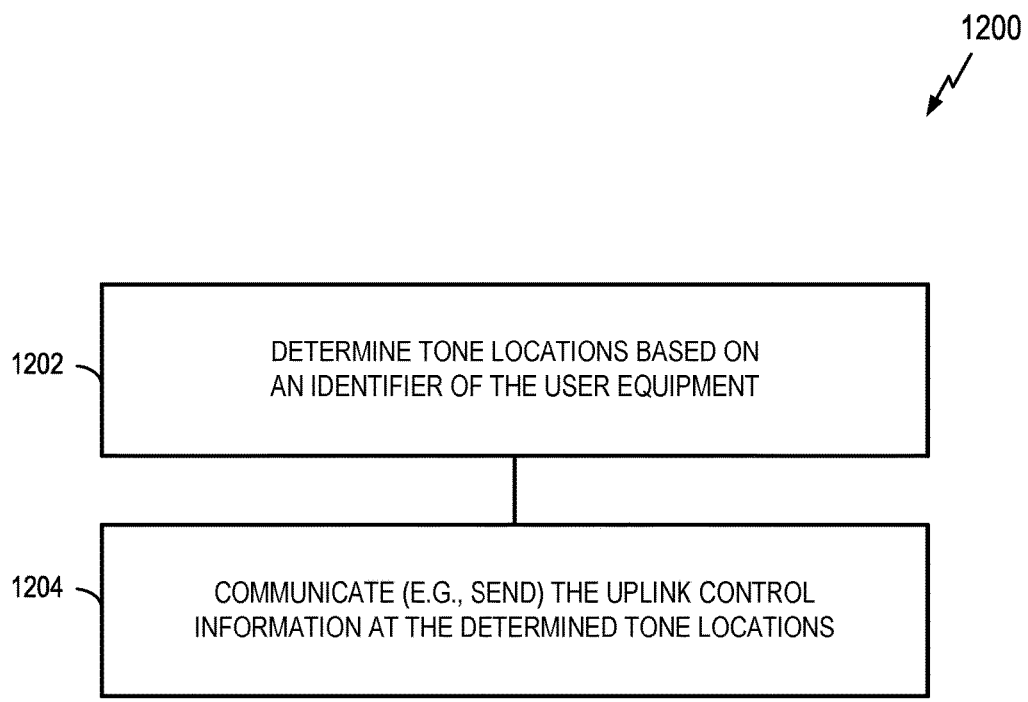
FIG. 12 is a flowchart illustrating an example of another process for communicating uplink control information in accordance with some aspects of the disclosure.

FIG. 12 illustrates a process 1200 for communication in accordance with some aspects of the disclosure. In some aspects, the process 1200 may be performed in conjunction with (e.g., as part of or in addition to) the process 900 of FIG. 9. The process 1200 may take place within a processing circuit (e.g., the processing circuit 810 of FIG. 8), which may be located in a UE, a base station, or some other suitable apparatus. Of course, in various aspects within the scope of the disclosure, the process 1200 may be implemented by any suitable apparatus capable of supporting communication-related operations.

At block 1202, an apparatus (e.g., a UE) determines tone locations based on an identifier of a user equipment. In some aspects, this determination may be made according to a mapping between UE identifiers and tone locations.

In some implementations, the circuit/module for determining tone locations 824 of FIG. 8 performs the operations of block 1202. In some implementations, the code for determining tone locations 836 of FIG. 8 is executed to perform the operations of block 1202.

At block 1204, the apparatus communicates (e.g., sends) uplink control information at the tone locations determined at block 1202. For example, a UE may send (e.g., transmit) the uplink control information at these tone locations.

In some implementations, the circuit/module for communicating 820 of FIG. 8 performs the operations of block 1204. In some implementations, the code for communicating 832 of FIG. 8 is executed to perform the operations of block 1204.

Fifth Example Process

Figure 13:
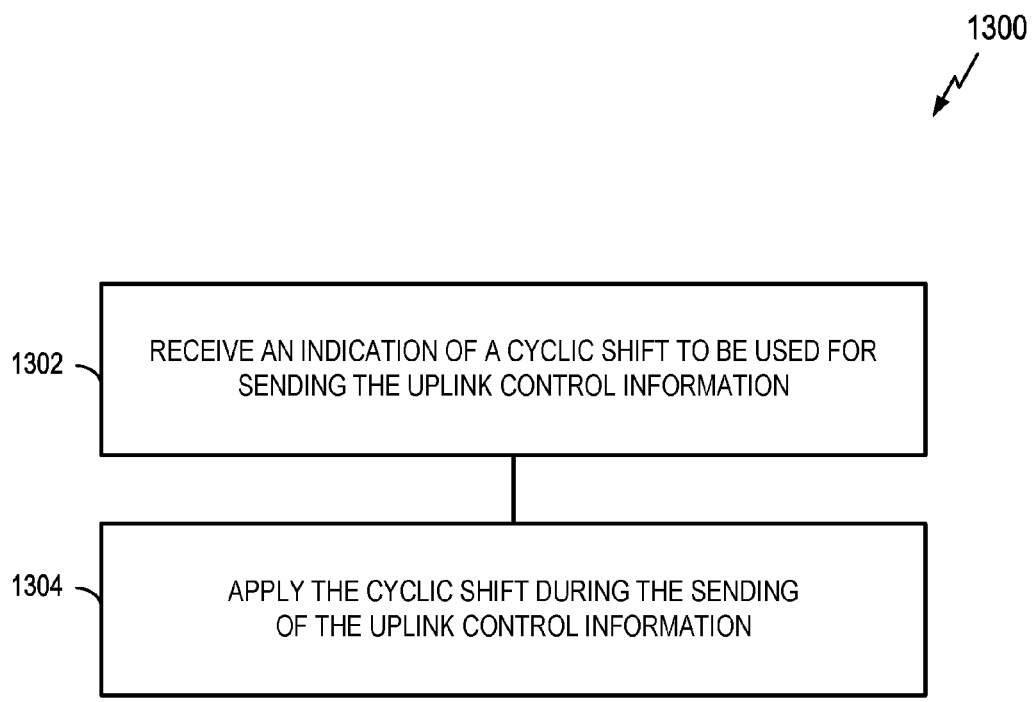
FIG. 13 is a flowchart illustrating an example of a process for applying a cyclic shift in accordance with some aspects of the disclosure.

FIG. 13 illustrates a process 1300 for communication in accordance with some aspects of the disclosure. In some aspects, the process 1300 may be performed in conjunction with (e.g., as part of or in addition to) the process 900 of FIG. 9. The process 1300 may take place within a processing circuit (e.g., the processing circuit 810 of FIG. 8), which may be located in a UE, a base station, or some other suitable apparatus. Of course, in various aspects within the scope of the disclosure, the process 1300 may be implemented by any suitable apparatus capable of supporting communication-related operations.

At block 1302, an apparatus (e.g., a UE) receives an indication of a cyclic shift (e.g., from a base station). In some aspects, this cyclic shift is to be used for sending (e.g., transmission of) the uplink control information.

In some implementations, the circuit/module for receiving 826 or the circuit/module for communicating 820 of FIG. 8 performs the operations of block 1302. In some implementations, the code for receiving 838 or the code for communicating 832 of FIG. 8 is executed to perform the operations of block 1302.

At block 1304, the apparatus applies the cyclic shift during the sending (e.g., transmission) of the uplink control information.

In some implementations, the circuit/module for applying 830 or the circuit/module for communicating 820 of FIG. 8 performs the operations of block 1304. In some implementations, the code for applying 842 or the code for communicating 832 of FIG. 8 is executed to perform the operations of block 1304.

Sixth Example Process

Figure 14:
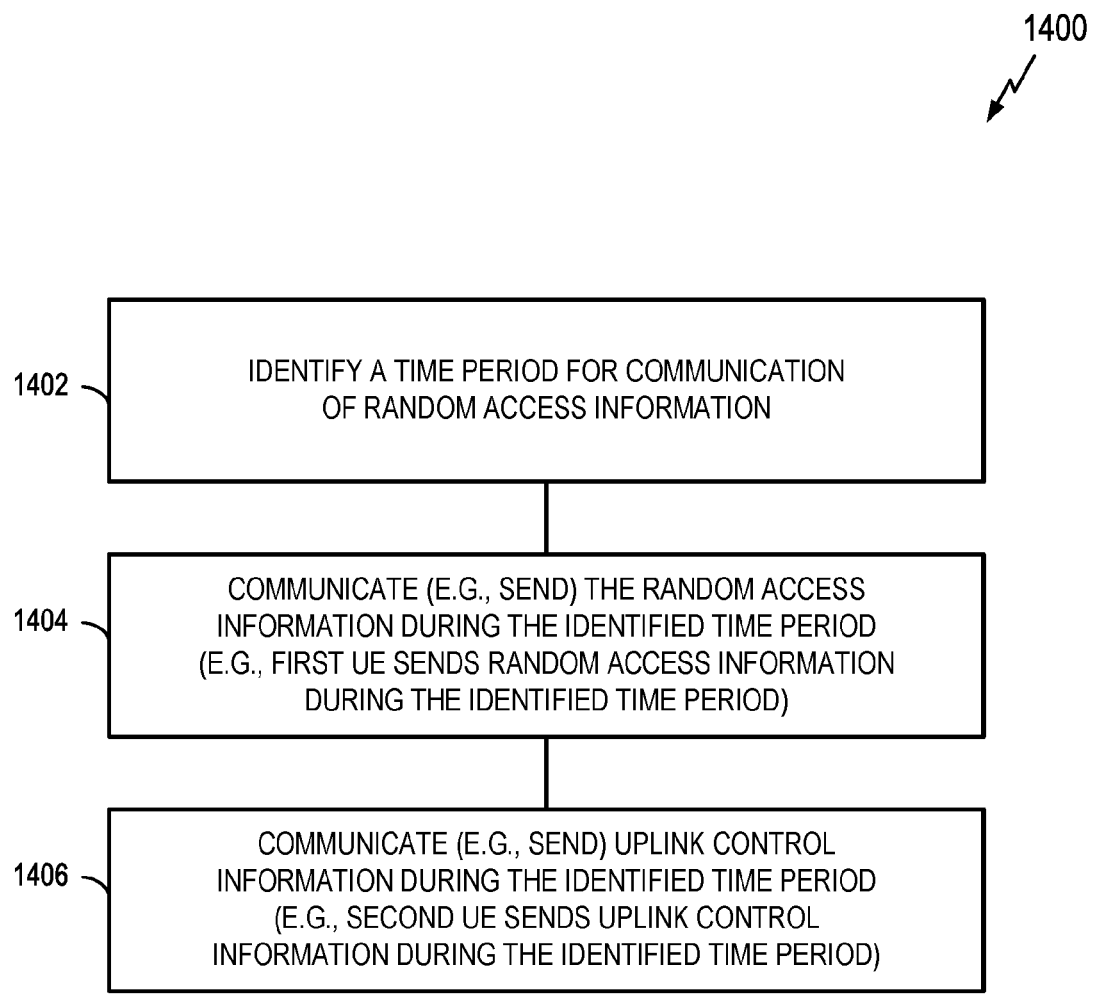
FIG. 14 is a flowchart illustrating an example of another process for communicating uplink control information in accordance with some aspects of the disclosure.

FIG. 14 illustrates a process 1400 for communication in accordance with some aspects of the disclosure. In some aspects, the process 1400 may be performed in conjunction with (e.g., as part of or in addition to) the process 900 of FIG. 9. The process 1400 may take place within a processing circuit (e.g., the processing circuit 810 of FIG. 8), which may be located in a UE, a base station, or some other suitable apparatus. Of course, in various aspects within the scope of the disclosure, the process 1400 may be implemented by any suitable apparatus capable of supporting communication-related operations.

At block 1402, an apparatus (e.g., a UE) identifies a time period for communication of random access information. For example, the apparatus may select symbol locations within a frame. In some aspects, a UE may determine a frame index to transmit RACH and PUCCH from directed primary synchronization signals.

In some implementations, the circuit/module for communicating 820 of FIG. 8 performs the operations of block 1402. In some implementations, the code for communicating 832 of FIG. 8 is executed to perform the operations of block 1402.

At block 1404, an apparatus communicates (e.g., sends, transmits, etc.) the random access information during the identified time period. For example, a first UE (or a first set of UEs) that identified the time period at block 1402 may send random access information during the identified time period. In some aspects, the random access information may be communicated via an inner portion of bandwidth allocated for communication of a frame. In some aspects, the random access information may be random access channel (RACH) information. In some aspects, the communication of the random access information may include communicating the random access information in a directional manner.

In some implementations, the circuit/module for communicating 820 of FIG. 8 performs the operations of block 1404. In some implementations, the code for communicating 832 of FIG. 8 is executed to perform the operations of block 1404.

At block 1406, an apparatus communicates (e.g., sends, transmits, etc.) uplink control information during the identified time period. For example, a second UE (or a second set of UEs) that identifies the time period used by a first UE for communicating random access information (at block 1402) may send control information during the identified time period. In some aspects, the random access information and the uplink control information may be communicated as frequency division multiplexed orthogonal tones. In some aspects, the uplink control information and the random access information may be communicated concurrently with each other and exclusive of any other information within a frame. In some aspects, the uplink control information may be communicated via an outer portion of the bandwidth allocated for communication of a frame.

In some implementations, the circuit/module for communicating 820 of FIG. 8 performs the operations of block 1406. In some implementations, the code for communicating 832 of FIG. 8 is executed to perform the operations of block 1406.

Second Example Apparatus

Figure 15:
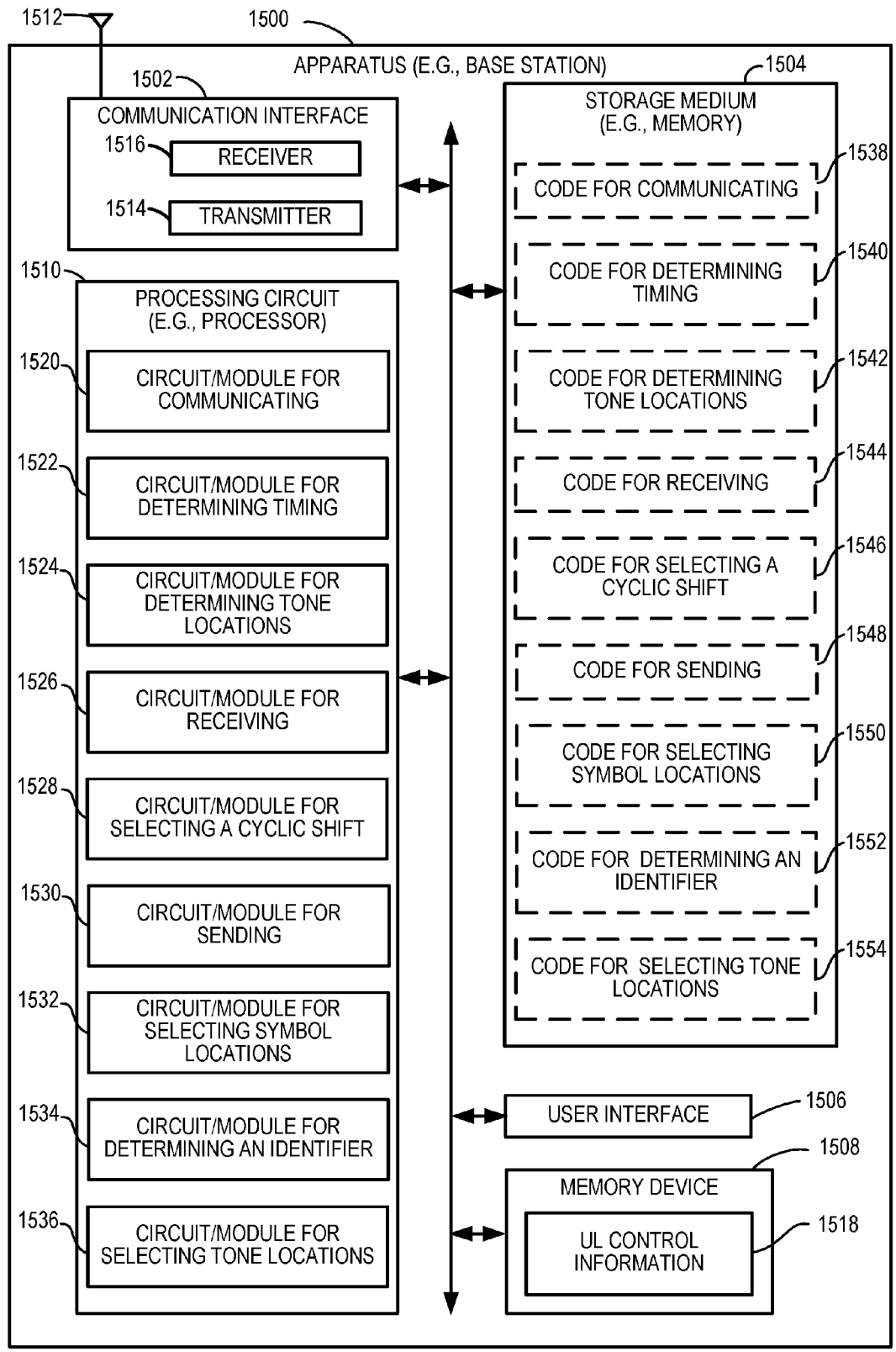
FIG. 15 is a block diagram illustrating an example hardware implementation for another apparatus (e.g., an electronic device) that can support communication in accordance with some aspects of the disclosure.

FIG. 15 illustrates a block diagram of an example hardware implementation of an apparatus 1500 configured to communicate according to one or more aspects of the disclosure. The apparatus 1500 could embody or be implemented within a base station, a UE, or some other type of device that supports wireless communication. In various implementations, the apparatus 1500 could embody or be implemented within an access terminal, an access point, or some other type of device. In various implementations, the apparatus 1500 could embody or be implemented within a mobile phone, a smart phone, a tablet, a portable computer, a server, a personal computer, a sensor, an entertainment device, a medical device, or any other electronic device having circuitry.

The apparatus 1500 includes a communication interface 1502 (e.g., at least one transceiver), a storage medium 1504 (e.g., a memory device), a user interface 1506, a memory device 1508 (e.g., storing uplink control information 1518), and a processing circuit 1510 (e.g., at least one processor). In various implementations, the user interface 1506 may include one or more of: a keypad, a display, a speaker, a microphone, a touchscreen display, of some other circuitry for receiving an input from or sending an output to a user. The communication interface 1502 may be coupled to one or more antennas 1512, and may include a transmitter 1514 and a receiver 1516. In general, the components of FIG. 15 may be similar to corresponding components of the apparatus 800 of FIG. 8.

According to one or more aspects of the disclosure, the processing circuit 1510 may be adapted to perform any or all of the features, processes, functions, operations and/or routines for any or all of the apparatuses described herein. For example, the processing circuit 1510 may be configured to perform any of the steps, functions, and/or processes described with respect to FIGS. 16-23. As used herein, the term "adapted" in relation to the processing circuit 1510 may refer to the processing circuit 1510 being one or more of configured, employed, implemented, and/or programmed to perform a particular process, function, operation and/or routine according to various features described herein.

The processing circuit 1510 may be a specialized processor, such as an application specific integrated circuit (ASIC) that serves as a means for (e.g., structure for) carrying out any one of the operations described in conjunction with FIGS. 16-23. The processing circuit 1510 serves as one example of a means for transmitting and/or a means for receiving. In various implementations, the processing circuit 1510 may incorporate the functionality of the base station 206 of FIG. 2.

According to at least one example of the apparatus 1500, the processing circuit 1510 may include one or more of a circuit/module for communicating 1520, a circuit/module for determining timing 1522, a circuit/module for determining tone locations 1524, a circuit/module for receiving 1526, a circuit/module for selecting a cyclic shift 1528, a circuit/module for sending 1530, a circuit/module for selecting symbol locations 1532, a circuit/module for determining an identifier 1534, or a circuit/module for selecting tone locations 1536. In various implementations, the circuit/module for communicating 1520, the circuit/module for determining timing 1522, the circuit/module for determining tone locations 1524, the circuit/module for receiving 1526, the circuit/module for selecting a cyclic shift 1528, the circuit/module for sending 1530, the circuit/module for selecting symbol locations 1532, the circuit/module for determining an identifier 1534, or the circuit/module for selecting tone locations 1536 may correspond, at least in part, to the functionality of the base station 206 of FIG. 2.

As mentioned above, programming stored by the storage medium 1504, when executed by the processing circuit 1510, causes the processing circuit 1510 to perform one or more of the various functions and/or process operations described herein. For example, the programming, when executed by the processing circuit 1510, may cause the processing circuit 1510 to perform the various functions, steps, and/or processes described herein with respect to FIGS. 16-23 in various implementations. As shown in FIG. 15, the storage medium 1504 may include one or more of code for communicating 1538, code for determining timing 1540, code for determining tone locations 1542, code for receiving 1544, code for selecting a cyclic shift 1546, code for sending 1548, code for selecting symbol locations 1550, code for determining an identifier 1552, or code for selecting tone locations 1554. In various implementations, the code for communicating 1538, the code for determining timing 1540, the code for determining tone locations 1542, the code for receiving 1544, the code for selecting a cyclic shift 1546, the code for sending 1548, the code for selecting symbol locations 1550, the code for determining an identifier 1552, or the code for selecting tone locations 1554 may be executed or otherwise used to provide the functionality described herein for the circuit/module for communicating 1520, the circuit/module for determining timing 1522, the circuit/module for determining tone locations 1524, the circuit/module for receiving 1526, the circuit/module for selecting a cyclic shift 1528, the circuit/module for sending 1530, the circuit/module for selecting symbol locations 1532, the circuit/module for determining an identifier 1534, or the circuit/module for selecting tone locations 1536, respectively.

The circuit/module for communicating 1520 may include circuitry and/or programming (e.g., code for communicating 1538 stored on the storage medium 1504) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 1520 may communicate (e.g., send) directed primary synchronization signals. In some aspects, the circuit/module for communicating 1520 may communicate (e.g., receive) uplink control information (e.g., at particular symbol locations within a frame and/or at particular tone locations within a frame). In some aspects, the circuit/module for communicating 1520 may communicate (e.g., receive) random access information (e.g., via a frame). In some aspects, the circuit/module for communicating 1520 may communicate (e.g., send) signals to assist a plurality of UEs to transmit uplink control information. In some aspects, the circuit/module for communicating 1520 may communicate (e.g., send) an indication of timing (e.g., selected symbol locations). In some aspects, the circuit/module for communicating 1520 may communicate (e.g., send) an indication of selected tone locations. In some aspects, the circuit/module for communicating 1520 may communicate (e.g., send) an indication of a selected cyclic shift. In some aspects, the circuit/module for communicating 1520 may communicate (e.g., send and/or receive) an identifier of user equipment.

In some implementation, the circuit/module for communicating 1520 may use one or more parameters for the communicating. For example, the circuit/module for communicating 1520 may select timing (e.g., symbol locations) and/or tone locations and communicate (e.g., receive) information at those locations. As another example, the circuit/module for communicating 1520 may obtain information about a cyclic shift and then use that cyclic shift when communicating (e.g., receiving) information.

In some implementations where the communicating involves receiving information, the circuit/module for communicating 1520 receives information (e.g., from the communication interface 1502, the receiver 1516, the memory device 1508, some other component of the apparatus 1500, or some other device), processes (e.g., decodes) the information, and outputs the information to another component of the apparatus 1500 (e.g., the memory device 1508 or some other component). In some scenarios (e.g., if the circuit/module for communicating 1520 includes a receiver), the communicating involves the circuit/module for communicating 1520 receiving information directly from a device that transmitted the information (e.g., via radio frequency signaling or some other type of signaling suitable for the applicable communication medium).

In some implementations where the communicating involves sending information, the circuit/module for communicating 1520 obtains information (e.g., from the memory device 1508 or some other component of the apparatus 1500), processes (e.g., encodes) the information, and outputs the processed information. In some scenarios, the communicating involves sending the information to another component of the apparatus 1500 (e.g., the transmitter 1514, the communication interface 1502, or some other component) that will transmit the information to another device. In some scenarios (e.g., if the circuit/module for communicating 1520 includes a transmitter), the communicating involves the circuit/module for communicating 1520 transmitting the information directly to another device (e.g., the ultimate destination) via radio frequency signaling or some other type of signaling suitable for the applicable communication medium.

In some implementations, the circuit/module for communicating 1520 is a transceiver. In some implementations, the circuit/module for communicating 1520 is a receiver. In some implementations, the circuit/module for communicating 1520 is a transmitter. In some implementations, the communication interface 1502 includes the circuit/module for communicating 1520 and/or the code for communicating 1538. In some implementations, the circuit/module for communicating 1520 and/or the code for communicating 1538 is configured to control the communication interface 1502 (e.g., a transceiver, a receiver, or a transmitter) to communicate the information.

The circuit/module for determining timing 1522 may include circuitry and/or programming (e.g., code for determining timing 1540 stored on the storage medium 1504) adapted to perform several functions relating to, for example, determining timing for communication of uplink control information. In some aspects, the determined timing may be used to receive uplink control information. In some aspects, the determined timing may denote at least one of: a symbol index, a sub-frame index, a radio frame index, or any combination thereof. In some aspects, the determined timing may include symbol locations.

In some implementations, the circuit/module for determining timing 1522 performs the operations that follow if the determination of the timing (e.g., symbol locations) is based on directed primary synchronization signals. In this case, the circuit/module for determining timing 1522 obtains information about the directed primary synchronization signals (e.g., from the circuit/module for communicating 1520, the memory device 1508, the communication interface 1502, the receiver 1516, or some other component). For example, the circuit/module for determining timing 1522 may obtain information about which beams the apparatus 1500 uses to transmit the directed primary synchronization signals (e.g., as discussed herein in conjunction with FIG. 3 and/or FIG. 4). The circuit/module for determining timing 1522 may then identify the timing (e.g., symbol locations) to be used for communication based on this information (e.g., as discussed herein in conjunction with FIG. 3 and/or FIG. 4). For example, the circuit/module for determining timing 1522 may identify (e.g., based on a mapping) the timing (e.g., a symbol location or symbol locations) associated with each beam used to transmit the directed primary synchronization signals. The circuit/module for determining timing 1522 outputs an indication of the determined timing (e.g., to the circuit/module for communicating 1520, the memory device 1508, the communication interface 1502, the receiver 1516, or some other component).

The circuit/module for determining tone locations 1524 may include circuitry and/or programming (e.g., code for determining tone locations 1536 stored on the storage medium 1504) adapted to perform several functions relating to, for example, determining tone locations for communication of uplink control information within a frame. In some aspects, the determined tone locations may be used to receive uplink control information.

In some implementations, the circuit/module for determining tone locations 824 performs the operations that follow if the determination of the tone locations is based on directed primary synchronization signals. In this case, the circuit/module for determining tone locations 1524 obtains information about the directed primary synchronization signals (e.g., from the circuit/module for communicating 1520, the memory device 1508, the communication interface 1502, the receiver 1516, or some other component). For example, the circuit/module for determining tone locations 1524 may obtain information about which beams the apparatus 1500 uses to transmit the directed primary synchronization signals (e.g., as discussed herein in conjunction with FIG. 3 and/or FIG. 4). The circuit/module for determining tone locations 1524 may then identify the tone locations to be used for communication based on this information (e.g., as discussed herein in conjunction with FIG. 3 and/or FIG. 4). For example, the circuit/module for determining tone locations 1524 may identify (e.g., based on a mapping) the tone location(s) associated with each beam used to transmit the directed primary synchronization signals. The circuit/module for determining tone locations 1524 outputs an indication of the determined tone locations (e.g., to the circuit/module for communicating 1520, the memory device 1508, the communication interface 1502, the receiver 1516, or some other component).

The circuit/module for receiving 1526 may include circuitry and/or programming (e.g., code for receiving 1538 stored on the storage medium 1504) adapted to perform several functions relating to, for example, receiving information. In some implementations, the circuit/module for receiving 1526 performs the operations that follow. The circuit/module for receiving 1526 obtains information (e.g., from the communication interface 1502, the receiver 1516, the memory device 1508, some other component of the apparatus 1500, or some other device), processes (e.g., decodes) the information, and outputs the information to another component of the apparatus 1500 (e.g., the memory device 1508 or some other component). In some scenarios (e.g., if the circuit/module for receiving 1526 includes a receiver), the circuit/module for receiving 1526 receives information directly from a device that transmitted the information (e.g., via radio frequency signaling or some other type of signaling suitable for the applicable communication medium).

The received information may take different forms in different scenarios. In some aspects, the circuit/module for receiving 1526 may receive uplink control information. In some aspects, the circuit/module for receiving 1526 may receive random access information.

In some implementations, the circuit/module for receiving 1526 is or includes a receiver. In some implementations, the communication interface 1502 includes the circuit/module for receiving 1526 and/or the code for receiving 1544. In some implementations, the circuit/module for receiving 1526 and/or the code for receiving 1544 is configured to control the communication interface 1502 (e.g., a transceiver or a receiver) to receive the information.

The circuit/module for selecting a cyclic shift 1528 may include circuitry and/or programming (e.g., code for selecting a cyclic shift 1546 stored on the storage medium 1504) adapted to perform several functions relating to, for example, selecting a cyclic shift to be used for transmission of information. In some scenarios, the information is uplink control information to be transmitted by a UE.

In some implementations, the circuit/module for selecting a cyclic shift 1528 performs the operations that follow. The circuit/module for selecting a cyclic shift 1528 identifies the subcarriers and the symbol locations used by different UEs for communication (e.g., uplink communication). For example, the circuit/module for selecting a cyclic shift 1528 may obtain this information from the communication interface 1502, the memory device 1508, or some other component of the apparatus 1500. The circuit/module for selecting a cyclic shift 1528 determines whether there is potential conflict between the subcarriers and the symbol locations used by different UEs. In the event there is potential conflict between the subcarriers and the symbol locations used by different UEs, the circuit/module for selecting a cyclic shift 1528 assigns a corresponding cyclic shift to one or more of the UEs in a manner that mitigates the potential conflict. Then, for each UE, the circuit/module for selecting a cyclic shift 1528 outputs an indication of the cyclic shift to be used by that UE (e.g., by sending the indication to the circuit/module for communicating 1520, the circuit/module for sending 1530, the memory device 1508, the communication interface 1502, the transmitter 1514, or some other component).

The circuit/module for sending 1530 may include circuitry and/or programming (e.g., code for sending 1548 stored on the storage medium 1504) adapted to perform several functions relating to, for example, sending information.

The information may take different forms in different scenarios. In some aspects, the circuit/module for sending 1530 may send (e.g., transmit) directed primary synchronization signals. In some aspects, the circuit/module for sending 1530 may send (e.g., transmit) signals to assist a plurality of UEs to transmit uplink control information. In some aspects, the circuit/module for sending 1530 may send (e.g., transmit) an indication of timing (e.g., selected symbol locations). In some aspects, the circuit/module for sending 1530 may send (e.g., transmit) an indication of selected tone locations. In some aspects, the circuit/module for sending 1530 may send (e.g., transmit) an indication of a selected cyclic shift. In some aspects, the circuit/module for sending 1530 may send (e.g., transmit) an identifier of user equipment.

In some implementations, the circuit/module for sending 1530 performs the operations that follow. The circuit/module for sending 1530 obtains information (e.g., from the memory device 1508, the circuit/module for selecting a cyclic shift 1528, the circuit/module for selecting symbol locations 1532, the circuit/module for determining an identifier 1534, the circuit/module for selecting tone locations 1536, or some other component of the apparatus 1500). The circuit/module for sending 1530 then processes (e.g., encodes) the information and outputs the processed information. In some scenarios, the circuit/module for sending 1530 sends the information to another component of the apparatus 1500 (e.g., the transmitter 1514, the communication interface 1502, or some other component) that will transmit the information to another device. In some scenarios (e.g., if the circuit/module for sending 1530 includes a transmitter), the circuit/module for sending 1530 transmits the information directly to another device (e.g., the ultimate destination) via radio frequency signaling or some other type of signaling suitable for the applicable communication medium.

In some implementations, the circuit/module for sending 1530 is or includes a transmitter. In some implementations, the communication interface 1502 includes the circuit/module for sending 1530 and/or the code for sending 1548. In some implementations, the circuit/module for sending 1530 and/or the code for sending 1548 is configured to control the communication interface 1502 (e.g., a transceiver or a transmitter) to send the information.

The circuit/module for selecting symbol locations 1532 may include circuitry and/or programming (e.g., code for selecting symbol locations 1550 stored on the storage medium 1504) adapted to perform several functions relating to, for example, selecting symbol locations within a frame for communication of information. In some scenarios, the information is uplink information to be transmitted by a UE.

In some implementations, the circuit/module for selecting symbol locations 1532 performs the operations that follow. The circuit/module for selecting symbol locations 1532 identifies the symbol locations used by different UEs for communication (e.g., uplink communication). For example, the circuit/module for selecting symbol locations 1532 may obtain this information from the communication interface 1502, the memory device 1508, or some other component of the apparatus 1500. The circuit/module for selecting symbol locations 1532 determines whether there is potential conflict between the symbol locations used by different UEs. In the event there is potential conflict between the symbol locations used by different UEs, the circuit/module for selecting symbol locations 1532 assigns one or more corresponding symbol locations to one or more of the UEs in a manner that mitigates the potential conflict. Then, for each UE, the circuit/module for selecting symbol locations 1532 outputs an indication of the symbol locations to be used by that UE (e.g., by sending the indication to the circuit/module for communicating 1520, the circuit/module for sending 1530, the memory device 1508, the communication interface 1502, the transmitter 1514, or some other component).

In some implementations, the circuit/module for selecting symbol locations 1532 performs the operations that follow if the selection of the symbol locations is based on an identifier of a user equipment. In this case, the circuit/module for selecting symbol locations 1532 obtains the identifier (e.g., from the circuit/module for communicating 1520, the memory device 1508, the communication interface 1502, the receiver 1516, or some other component). The circuit/module for selecting symbol locations 1532 uses an identifier-to-symbol location mapping (e.g., in the form of a table, an algorithm, or some other suitable mapping) to identify the symbol location or locations associated with that identifier. The circuit/module for selecting symbol locations 1532 then outputs an indication of the determined symbol locations (e.g., to the circuit/module for communicating 1520, the memory device 1508, the communication interface 1502, the transmitter 1514, or some other component).

The circuit/module for determining an identifier 1534 may include circuitry and/or programming (e.g., code for determining an identifier 1552 stored on the storage medium 1504) adapted to perform several functions relating to, for example, determining an identifier for a UE. In some aspects, the identifier may be associated with particular tone locations.

In some implementations, the circuit/module for determining an identifier 1534 performs the operations that follow. The circuit/module for determining an identifier 1534 identifies the tone locations selected for a particular UE for communication (e.g., uplink communication). For example, the circuit/module for determining an identifier 1534 may obtain this information from the circuit/module for selecting tone locations 1536, the communication interface 1502, the memory device 1508, or some other component of the apparatus 1500. The circuit/module for determining an identifier 1534 may then access a mapping of tone locations and identifiers to determine which identifier corresponds to the selected tone locations. The circuit/module for determining an identifier 1534 then outputs an indication of the determined identifier (e.g., to the circuit/module for sending 1530, the circuit/module for communicating 1520, the memory device 1508, the communication interface 1502, the transmitter 1514, or some other component).

The circuit/module for selecting tone locations 1536 may include circuitry and/or programming (e.g., code for selecting tone locations 1554 stored on the storage medium 1504) adapted to perform several functions relating to, for example, selecting tone locations within a frame for communication of information. In some scenarios, the information is uplink information to be transmitted by a UE.

In some implementations, the circuit/module for selecting tone locations 1536 performs the operations that follow. The circuit/module for selecting tone locations 1536 identifies the tone locations used by different UEs for communication (e.g., uplink communication). For example, the circuit/module for selecting tone locations 1536 may obtain this information from the communication interface 1502, the memory device 1508, or some other component of the apparatus 1500. The circuit/module for selecting tone locations 1536 determines whether there is potential conflict between the tone locations used by different UEs. In the event there is potential conflict between the tone locations used by different UEs, the circuit/module for selecting tone locations 1536 assigns one or more corresponding tone locations to one or more of the UEs in a manner that mitigates the potential conflict. Then, for each UE, the circuit/module for selecting tone locations 1536 outputs an indication of the tone locations to be used by that UE (e.g., by sending the indication to the circuit/module for communicating 1520, the circuit/module for sending 1530, the memory device 1508, the communication interface 1502, the transmitter 1514, or some other component).

In some implementations, the circuit/module for selecting tone locations 1536 performs the operations that follow if the selection of the tone locations is based on an identifier of a user equipment. In this case, the circuit/module for selecting tone locations 1536 obtains the identifier (e.g., from the circuit/module for communicating 1520, the memory device 1508, the communication interface 1502, the receiver 1516, or some other component). The circuit/module for selecting tone locations 1536 uses an identifier-to-tone location mapping (e.g., in the form of a table, an algorithm, or some other suitable mapping) to identify the tone location or locations associated with that identifier. The circuit/module for selecting tone locations 1536 then outputs an indication of the determined tone locations (e.g., to the circuit/module for communicating 1520, the memory device 1508, the communication interface 1502, the transmitter 1514, or some other component).

Seventh Example Process

Figure 16:
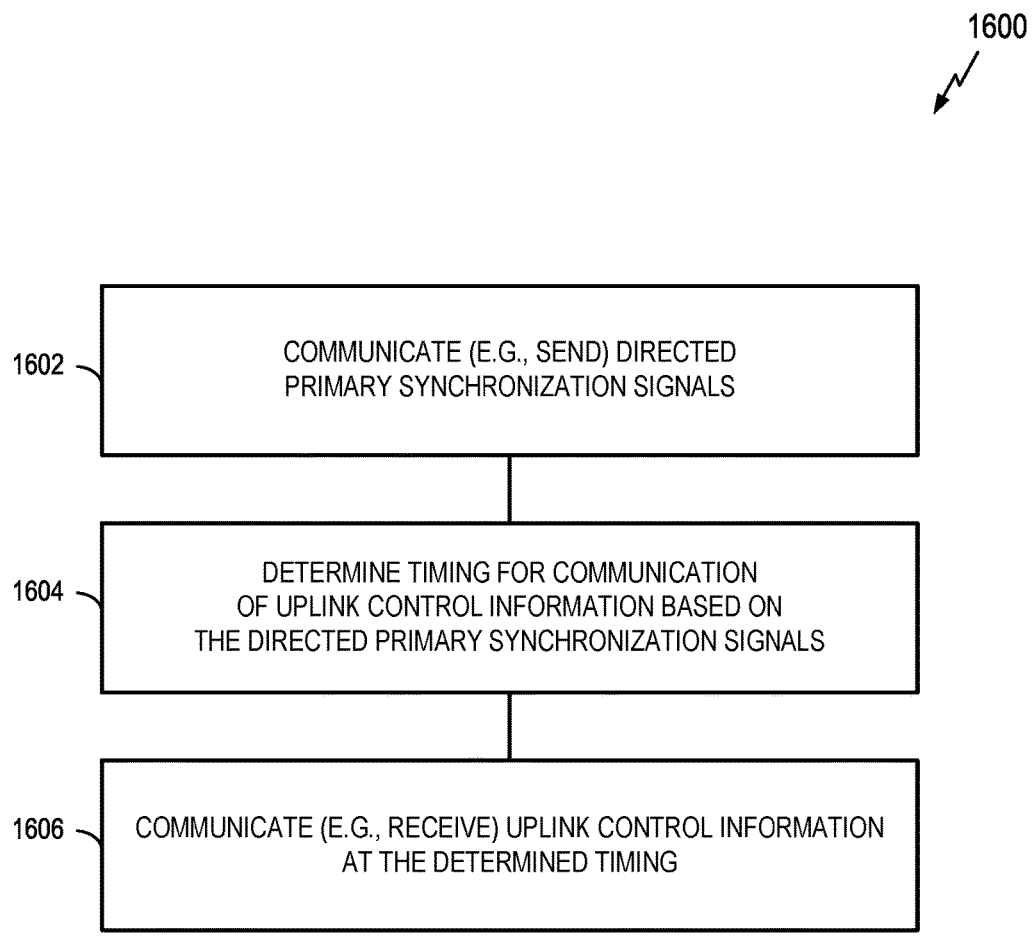
FIG. 16 is a flowchart illustrating an example of another process for communicating uplink control information in accordance with some aspects of the disclosure.

FIG. 16 illustrates a process 1600 for communication in accordance with some aspects of the disclosure. The process 1600 may take place within a processing circuit (e.g., the processing circuit 1510 of FIG. 15), which may be located in a base station, a UE, or some other suitable apparatus. Of course, in various aspects within the scope of the disclosure, the process 1600 may be implemented by any suitable apparatus capable of supporting communication-related operations.

At block 1602, an apparatus (e.g., a base station) communicates (e.g., sends) directed primary synchronization signals. For example, an eNB may send (e.g., transmit) directed primary synchronization signals to one or more UEs.

In some implementations, the circuit/module for sending 1530 or the circuit/module for communicating 1520 of FIG. 15 performs the operations of block 1602. In some implementations, the code for sending 1548 or the code for communicating 1538 of FIG. 15 is executed to perform the operations of block 1602.

At block 1604, the apparatus determines timing for communication of uplink control information. In some aspects, this determination may be based on the directed primary synchronization signals communicated at block 1602. In some aspects, the determined timing may denote at least one of: a symbol index, a sub-frame index, a radio frame index, or any combination thereof. In some aspects, the determined timing may include symbol locations (e.g., within a frame).

In some implementations, the circuit/module for determining timing 1522 of FIG. 15 performs the operations of block 1604. In some implementations, the code for determining timing 1540 of FIG. 15 is executed to perform the operations of block 1604.

At block 1606, the apparatus communicates (e.g., receives) the uplink control information at the determined timing (e.g., at a designated symbol index, sub-frame index, radio frame index, or some combination thereof). In some aspects, the uplink control information may include physical uplink control channel (PUCCH) information. In some aspects, the uplink control information may include scheduling request information. In some aspects, the uplink control information may include at least one of: channel quality information, precoding matrix information, a scheduling request, acknowledgement information, or any combination thereof.

In some aspects, the communication of the uplink control information includes receiving the uplink control information by a base station. For example, an eNB may receive the uplink control information from a UE via symbol locations determined at block 1604.

In some implementations, the circuit/module for receiving 1526 or the circuit/module for communicating 1520 of FIG. 15 performs the operations of block 1606. In some implementations, the code for receiving 1544 or the code for communicating 1538 of FIG. 15 is executed to perform the operations of block 1606.

Eighth Example Process

Figure 17:
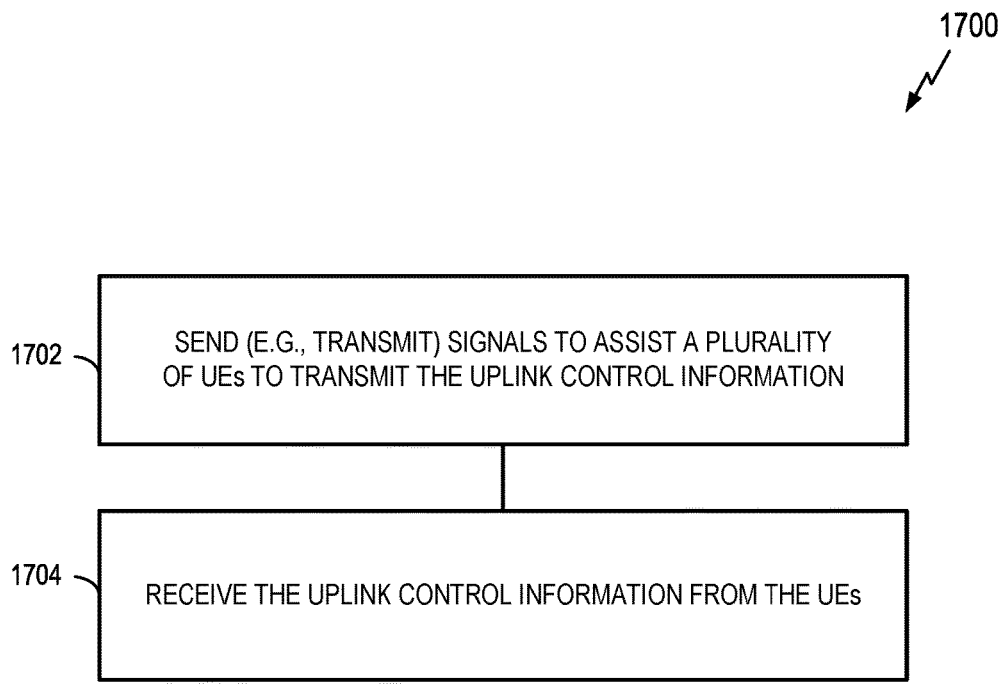
FIG. 17 is a flowchart illustrating an example of another process for communicating uplink control information in accordance with some aspects of the disclosure.

FIG. 17 illustrates a process 1700 for communication in accordance with some aspects of the disclosure. In some aspects, the process 1700 may be performed in conjunction with (e.g., as part of or in addition to) the process 1600 of FIG. 16. The process 1700 may take place within a processing circuit (e.g., the processing circuit 1510 of FIG. 15), which may be located in a base station, a UE, or some other suitable apparatus. Of course, in various aspects within the scope of the disclosure, the process 1700 may be implemented by any suitable apparatus capable of supporting communication-related operations.

At block 1702, an apparatus (e.g., a base station) sends (e.g., transmits) signals to assist a plurality of UEs to transmit the uplink control information. These signals may include, for example, one or more of: a DPSS, a radio resource control (RRC) signal (e.g., indicating symbol locations, tone locations, cyclic shift, etc.) transmitted during downlink traffic transmission, or some other signal.

In some implementations, the circuit/module for sending 1530 or the circuit/module for communicating 1520 of FIG. 15 performs the operations of block 1702. In some implementations, the code for sending 1548 or the code for communicating 1538 of FIG. 15 is executed to perform the operations of block 1702.

At block 1704, the apparatus receives the uplink control information from the UEs.

In some implementations, the circuit/module for receiving 1526 or the circuit/module for communicating 1520 of FIG. 15 performs the operations of block 1704. In some implementations, the code for receiving 1544 or the code for communicating 1538 of FIG. 15 is executed to perform the operations of block 1704.

Ninth Example Process

Figure 18:
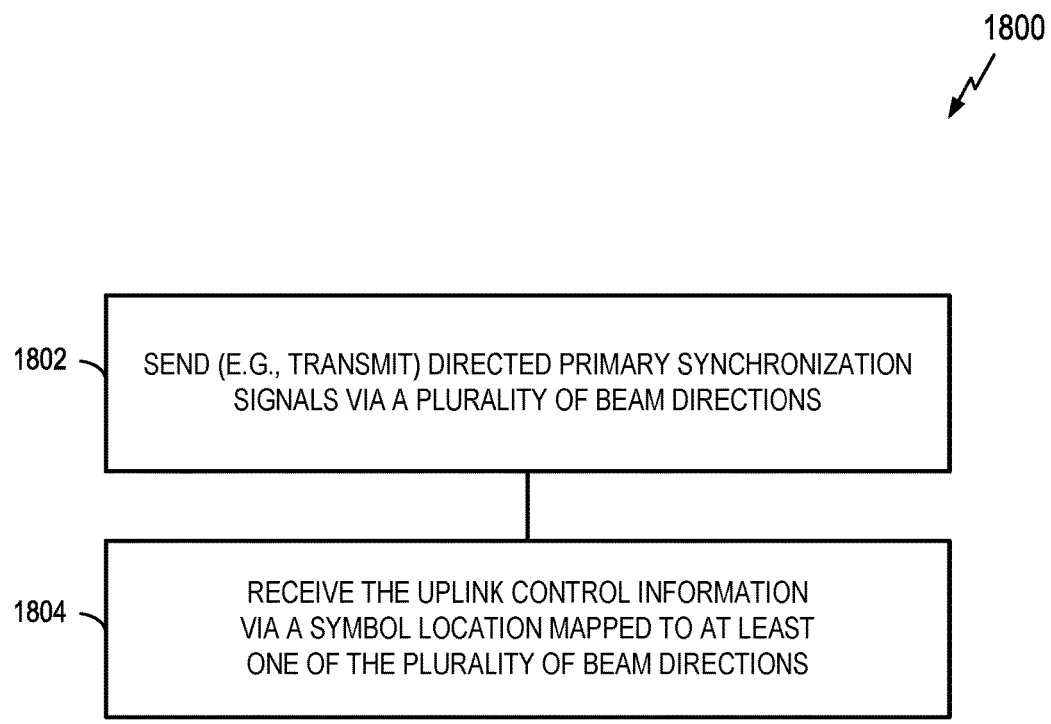
FIG. 18 is a flowchart illustrating an example of another process for communicating uplink control information in accordance with some aspects of the disclosure.

FIG. 18 illustrates a process 1800 for communication in accordance with some aspects of the disclosure. In some aspects, the process 1800 may be performed in conjunction with (e.g., as part of or in addition to) the process 1600 of FIG. 16. The process 1800 may take place within a processing circuit (e.g., the processing circuit 1510 of FIG. 15), which may be located in a base station, a UE, or some other suitable apparatus. Of course, in various aspects within the scope of the disclosure, the process 1800 may be implemented by any suitable apparatus capable of supporting communication-related operations.

At block 1802, an apparatus (e.g., a base station) sends (e.g., transmits) directed primary synchronization signals via a plurality of beam directions.

In some implementations, the circuit/module for sending 1530 or the circuit/module for communicating 1520 of FIG. 15 performs the operations of block 1802. In some implementations, the code for sending 1548 or the code for communicating 1538 of FIG. 15 is executed to perform the operations of block 1802.

At block 1804, the apparatus receives the uplink control information via a symbol location mapped to at least one of the plurality of beam directions. For example, a base station can transmit DPSS using beams 1, 2, 3, and 4 in time slots 1, 2, 3, and 4. On the other hand, the base station can receive DRACH using beams 5 and 6 in time slots 5 and 6. Beams 5 and 6 can be wider than beam 1, 2, 3, and 4. DRACH beam 5 can cover the angular regions of DPSS beams 1 and 2. DRACH beam 6 can cover the angular regions of DPSS beams 3 and 4. In this case, the UEs will still find its symbol location based on DPSS beam ID. If the best DPSS beam is #2, the UE will transmit PUCCH in symbol 5. If the best DPSS beam is #3, the UE will transmit PUCCH in time slot 6. In other words, there may be a one-to-one correspondence from a DPSS beam ID to a DRACH symbol location. The base station does not necessarily need to receive in the same set of beam directions.

In some implementations, the circuit/module for receiving 1526 or the circuit/module for communicating 1520 of FIG. 15 performs the operations of block 1804. In some implementations, the code for receiving 1544 or the code for communicating 1538 of FIG. 15 is executed to perform the operations of block 1804.

Tenth Example Process

Figure 19:
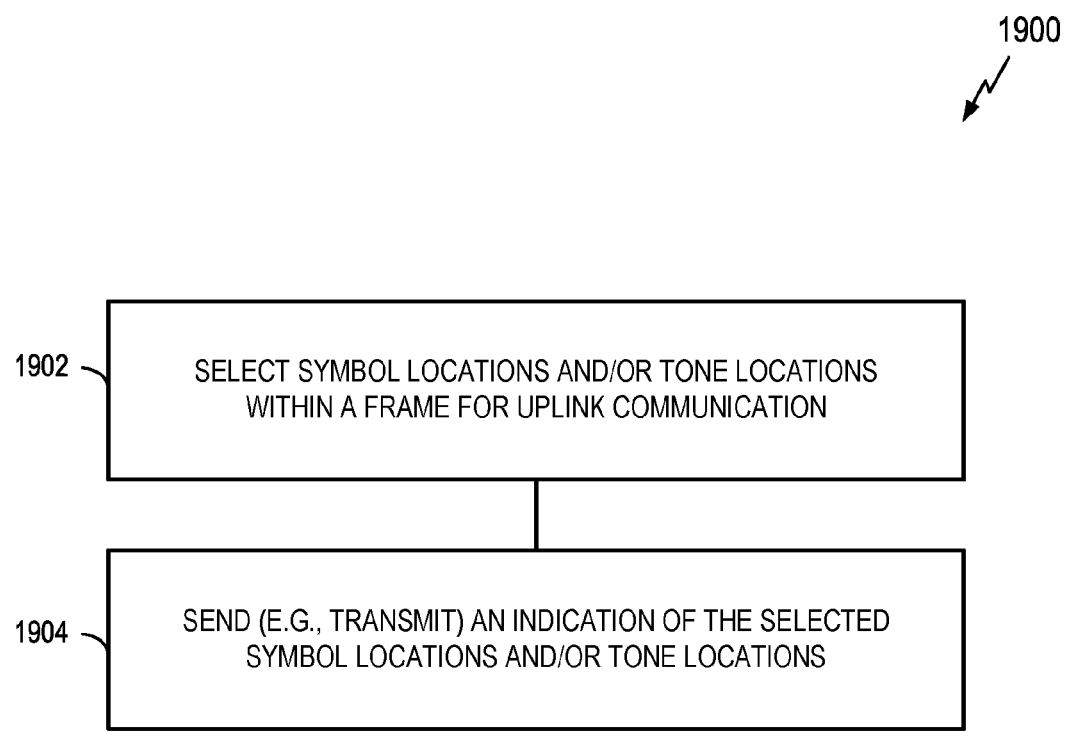
FIG. 19 is a flowchart illustrating an example of a process for selecting locations within a frame in accordance with some aspects of the disclosure.

FIG. 19 illustrates a process 1900 for communication in accordance with some aspects of the disclosure. In some aspects, the process 1900 may be performed in conjunction with (e.g., as part of or in addition to) the process 1600 of FIG. 16. The process 1900 may take place within a processing circuit (e.g., the processing circuit 1510 of FIG. 15), which may be located in a base station, a UE, or some other suitable apparatus. Of course, in various aspects within the scope of the disclosure, the process 1900 may be implemented by any suitable apparatus capable of supporting communication-related operations.

At block 1902, an apparatus (e.g., a base station) selects symbol locations and/or tone locations within a frame for uplink communication. For example, a base station may select symbol locations (e.g., in addition to symbol locations determined at block 1604) for uplink communication according to at least one criterion (e.g., a scheduling process). Alternatively or in addition, a base station may select tone locations for uplink communication according to at least one criterion.

In some implementations, the circuit/module for selecting symbol locations 1532 of FIG. 15 performs the operations of block 1902. In some implementations, the code for selecting symbol locations 1550 of FIG. 15 is executed to perform the operations of block 1902.

At block 1904, the apparatus sends (e.g., transmits) an indication of the symbol locations and/or tone locations selected at block 1902. For example, a base station may send an indication of the selected symbol locations to at least one UE. Alternatively or in addition, a base station may send an indication of the selected tone locations to at least one UE.

In some implementations, the circuit/module for sending 1530 or the circuit/module for communicating 1520 of FIG. 15 performs the operations of block 1904. In some implementations, the code for sending 1548 or the code for communicating 1538 of FIG. 15 is executed to perform the operations of block 1904.

Eleventh Example Process

Figure 20:
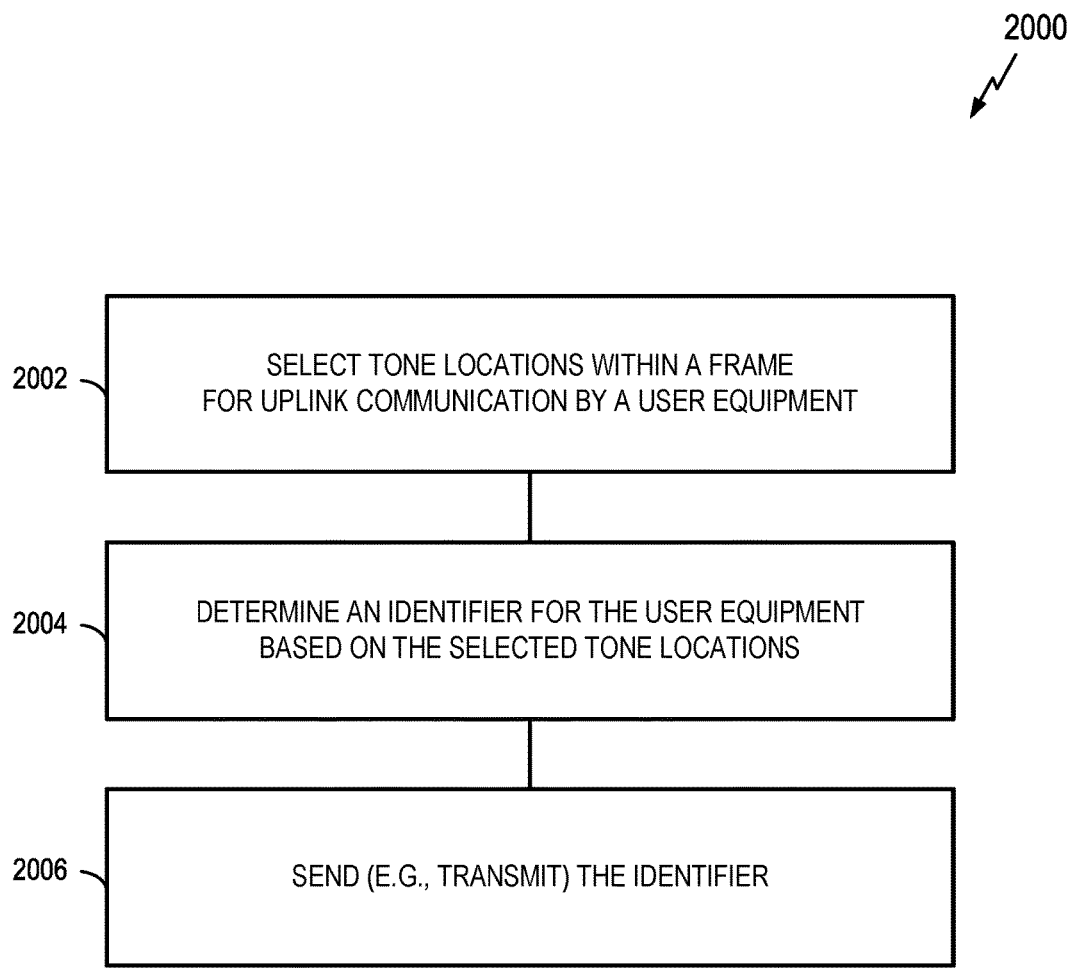
FIG. 20 is a flowchart illustrating an example of a process for selecting tone locations within a frame in accordance with some aspects of the disclosure.

FIG. 20 illustrates a process 2000 for communication in accordance with some aspects of the disclosure. In some aspects, the process 2000 may be performed in conjunction with (e.g., as part of or in addition to) the process 1600 of FIG. 16. The process 2000 may take place within a processing circuit (e.g., the processing circuit 1510 of FIG. 15), which may be located in a base station, a UE, or some other suitable apparatus. Of course, in various aspects within the scope of the disclosure, the process 2000 may be implemented by any suitable apparatus capable of supporting communication-related operations.

At block 2002, an apparatus (e.g., a base station) selects tone locations within a frame for uplink communication by a UE. For example, the base station may select non-conflicting tone locations. Other tone location selection criteria could be used in other scenarios.

In some implementations, the circuit/module for selecting tone locations 1536 of FIG. 15 performs the operations of block 2002. In some implementations, the code for selecting tone locations 1554 of FIG. 15 is executed to perform the operations of block 2002.

At block 2004, the apparatus determines an identifier for the UE based on the tone locations selected at block 2002. For example, the apparatus may access a mapping of tone locations and identifiers to determine which identifier corresponds to the selected tone locations.

In some implementations, the circuit/module for determining an identifier 1534 of FIG. 15 performs the operations of block 2004. In some implementations, the code for determining an identifier 1552 of FIG. 15 is executed to perform the operations of block 2004.

At block 2006, the apparatus sends (e.g., transmits) the identifier determined at block 2004. For example, a base station may send this identifier to the UE of block 2002.

In some implementations, the circuit/module for sending 1530 or the circuit/module for communicating 1520 of FIG. 15 performs the operations of block 2006. In some implementations, the code for sending 1548 or the code for communicating 1538 of FIG. 15 is executed to perform the operations of block 2006.

Twelfth Example Process

Figure 21:
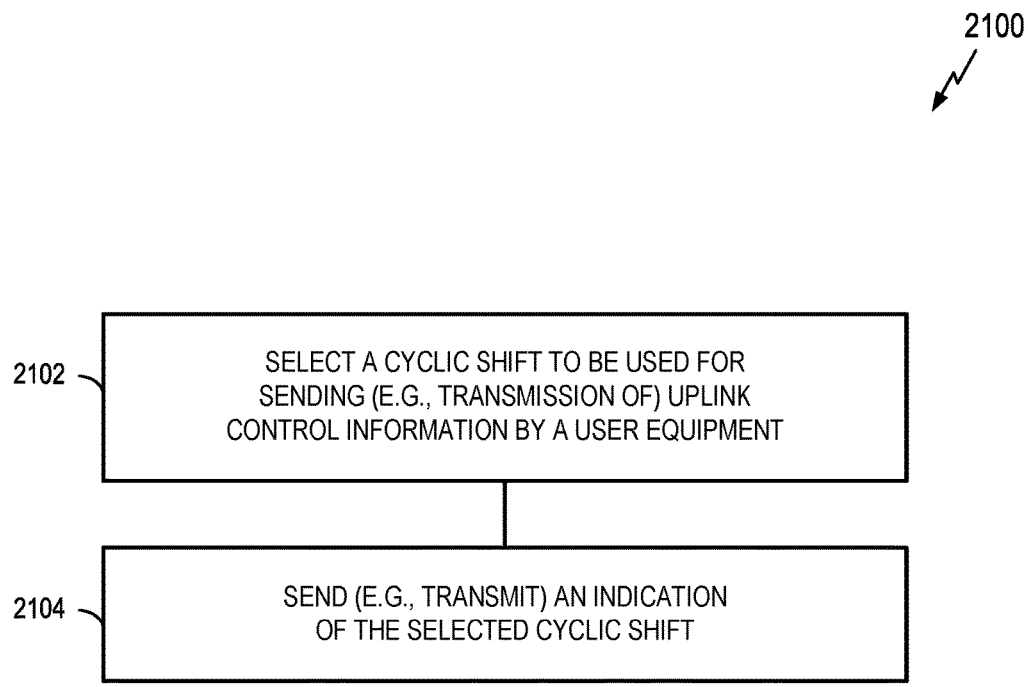
FIG. 21 is a flowchart illustrating an example of a process for selecting a cyclic shift in accordance with some aspects of the disclosure.

FIG. 21 illustrates a process 2100 for communication in accordance with some aspects of the disclosure. In some aspects, the process 2100 may be performed in conjunction with (e.g., as part of or in addition to) the process 1600 of FIG. 16. The process 2100 may take place within a processing circuit (e.g., the processing circuit 1510 of FIG. 15), which may be located in a base station, a UE, or some other suitable apparatus. Of course, in various aspects within the scope of the disclosure, the process 2100 may be implemented by any suitable apparatus capable of supporting communication-related operations.

At block 2102, an apparatus (e.g., a base station) selects a cyclic shift to be used for transmission of uplink control information by a UE.

In some implementations, the circuit/module for selecting a cyclic shift 1528 of FIG. 15 performs the operations of block 2102. In some implementations, the code for selecting a cyclic shift 1546 of FIG. 15 is executed to perform the operations of block 2102.

At block 2104, the apparatus sends (e.g., transmits) an indication of the selected cyclic shift.

In some implementations, the circuit/module for sending 1530 or the circuit/module for communicating 1520 of FIG. 15 performs the operations of block 2104. In some implementations, the code for sending 1548 or the code for communicating 1538 of FIG. 15 is executed to perform the operations of block 2104.

Thirteenth Example Process

Figure 22:
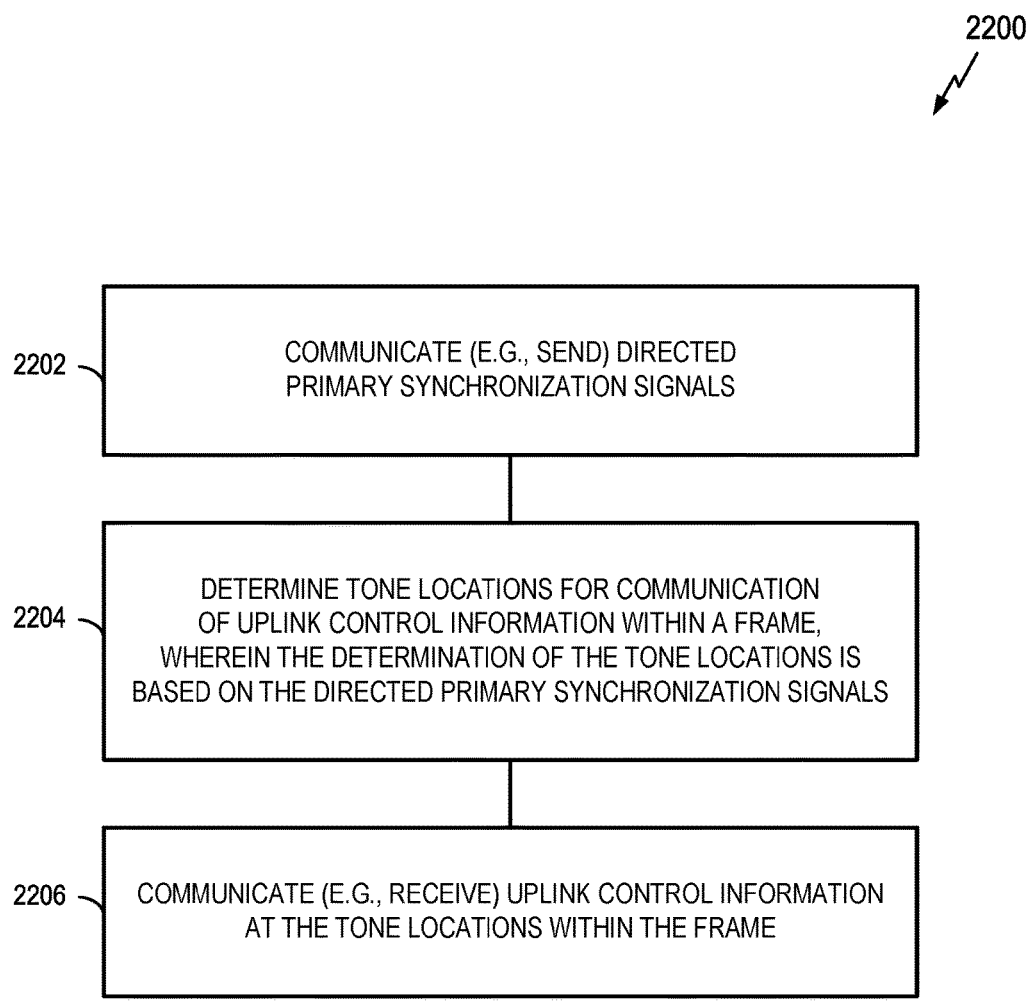
FIG. 22 is a flowchart illustrating an example of another process for communicating uplink control information in accordance with some aspects of the disclosure.

FIG. 22 illustrates a process 2200 for communication in accordance with some aspects of the disclosure. In some aspects, the process 2200 may be performed in conjunction with (e.g., as part of or in addition to) the process 1600 of FIG. 16. The process 2200 may take place within a processing circuit (e.g., the processing circuit 1510 of FIG. 15), which may be located in a base station, a UE, or some other suitable apparatus. Of course, in various aspects within the scope of the disclosure, the process 2200 may be implemented by any suitable apparatus capable of supporting communication-related operations.

At block 2202, an apparatus (e.g., a base station) communicates (e.g., sends, transmits, etc.) directed primary synchronization signals. For example, an eNB may transmit directed primary synchronization signals to nearby UEs. In some aspects, the operations of block 2202 may correspond to the operations of block 1602 of FIG. 16.

In some implementations, the circuit/module for sending 1530 or the circuit/module for communicating 1520 of FIG. 15 performs the operations of block 2202. In some implementations, the code for sending 1548 or the code for communicating 1538 of FIG. 15 is executed to perform the operations of block 2202.

At block 2204, the apparatus determines tone locations for communication of uplink control information within a frame. In some aspects, this determination may be based on the directed primary synchronization signals transmitted at block 2202.

In some implementations, the circuit/module for determining tone locations 1524 of FIG. 15 performs the operations of block 2204. In some implementations, the code for determining tone locations 1542 of FIG. 15 is executed to perform the operations of block 2004.

At block 2206, the apparatus communicates (e.g., receives) the uplink control information at the tone locations with the frame. For example, an eNB may receive the uplink control information from a UE via the tone locations determined at block 2204.

In some implementations, the circuit/module for receiving 1526 or the circuit/module for communicating 1520 of FIG. 15 performs the operations of block 2206. In some implementations, the code for receiving 1544 or the code for communicating 1538 of FIG. 15 is executed to perform the operations of block 2206.

Fourteenth Example Process

Figure 23:
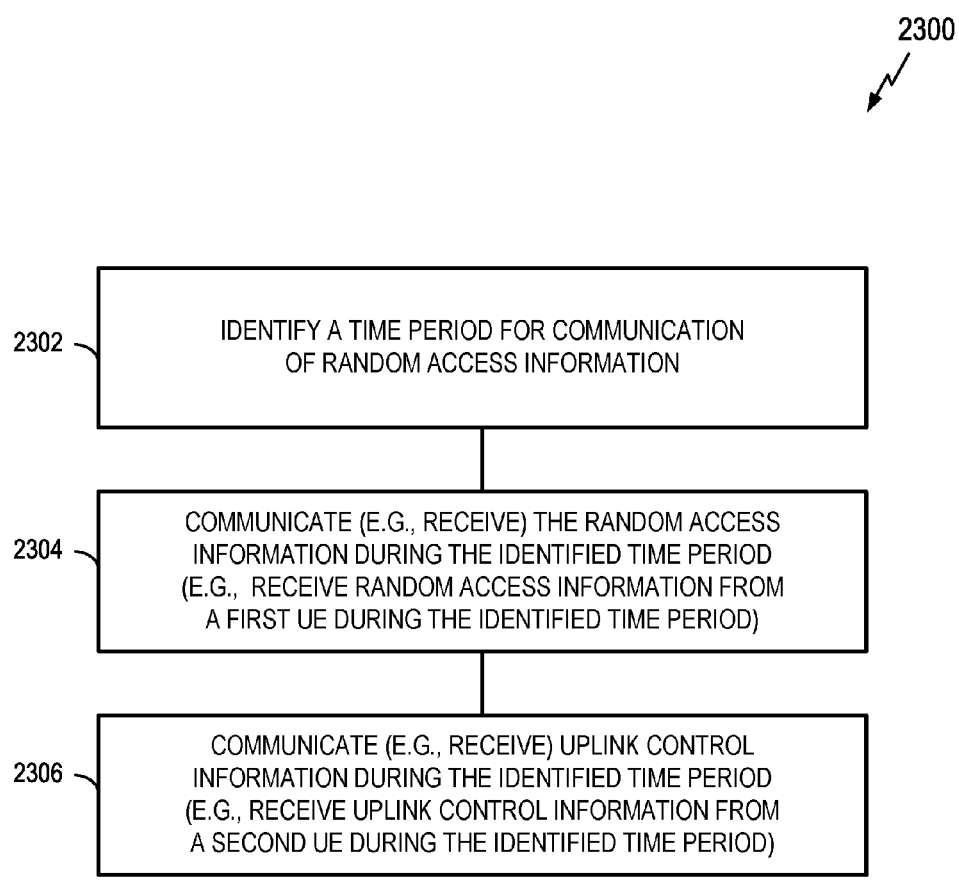
FIG. 23 is a flowchart illustrating an example of another process for communicating uplink control information in accordance with some aspects of the disclosure.

FIG. 23 illustrates a process 2300 for communication in accordance with some aspects of the disclosure. In some aspects, the process 2300 may be performed in conjunction with (e.g., as part of or in addition to) the process 1600 of FIG. 16. The process 2300 may take place within a processing circuit (e.g., the processing circuit 1510 of FIG. 15), which may be located in a base station, a UE, or some other suitable apparatus. Of course, in various aspects within the scope of the disclosure, the process 2300 may be implemented by any suitable apparatus capable of supporting communication-related operations.

At block 2302, an apparatus (e.g., a base station) identifies a time period for communication of random access information. For example, the apparatus may select symbol locations within a frame.

In some implementations, the circuit/module for communicating 1520 of FIG. 15 performs the operations of block 2302. In some implementations, the code for communicating 1538 of FIG. 15 is executed to perform the operations of block 2302.

At block 2304, the apparatus communicates (e.g., receives) the random access information during the identified time period. For example, a base station may receive the random access information from a first UE (or a first set of UEs). In some aspects, the random access information may be communicated via an inner portion of bandwidth allocated for communication of a frame. In some aspects, the random access information may be random access channel (RACH) information. In some aspects, the communication of the random access information may include communicating the random access information in a directional manner.

In some implementations, the circuit/module for receiving 1526 or the circuit/module for communicating 1520 of FIG. 15 performs the operations of block 2304. In some implementations, the code for receiving 1544 or the code for communicating 1538 of FIG. 15 is executed to perform the operations of block 2304.

At block 2306, the apparatus communicates (e.g., receives) uplink control information during the identified time period. For example, a base station may receive the uplink control information from a second UE (or a second set of UEs). In some aspects, the random access information and the uplink control information may be communicated as frequency division multiplexed orthogonal tones. In some aspects, the uplink control information and the random access information may be communicated concurrently with each other and exclusive of any other information within a frame. In some aspects, the uplink control information may be communicated via an outer portion of the bandwidth allocated for communication of a frame.

In some implementations, the circuit/module for receiving 1526 or the circuit/module for communicating 1520 of FIG. 15 performs the operations of block 2306. In some implementations, the code for receiving 1544 or the code for communicating 1538 of FIG. 15 is executed to perform the operations of block 2306.

Additional Aspects

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "I" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of a, b, or c" or "one or more of a, b, or c" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication, comprising:
receiving a directed synchronization signal;
determining a synchronization signal index associated with the directed synchronization signal;
determining timing for sending uplink control information, wherein the determination of the timing is based on the determined synchronization signal index; and
sending the uplink control information at the determined timing.

2. The method of claim 1, where the determined timing denotes at least one of: a slot, a sub-frame index, a radio frame index, or any combination thereof.

3. The method of claim 1, where the determined timing comprises symbol locations.

4. The method of claim 1, further comprising:
sending random access information via a frame.

5. The method of claim 4, wherein the uplink control information and the random access information are sent concurrently with each other and exclusive of any other information within the frame.

6. The method of claim 5, wherein:
the random access information is sent via an inner portion of bandwidth allocated for communication of the frame; and
the uplink control information is sent via an outer portion of the bandwidth allocated for communication of the frame.

7. The method of claim 4, wherein the random access information comprises random access channel (RACH) information.

8. The method of claim 4, wherein the sending of the random access information comprises sending the random access information in a directional manner.

9. The method of claim 1, further comprising:
determining tone locations for the sending of the uplink control information within a frame, wherein:
the determination of the tone locations is based on the directed synchronization signal, and
the uplink control information is sent at the tone locations within the frame.

10. The method of claim 1, further comprising:
receiving an indication of tone locations to be used for the sending of the uplink control information; and
using the tone locations to send the uplink control information.

11. The method of claim 1, wherein the sending of the uplink control information comprises sending the uplink control information by a user equipment.

12. The method of claim 11, further comprising:
receiving an indication of a cyclic shift to be used for the sending of the uplink control information; and
applying the cyclic shift during the sending of the uplink control information.

13. The method of claim 1, wherein the uplink control information comprises physical uplink control channel (PUCCH) information.

14. The method of claim 1, wherein the uplink control information comprises scheduling request information.

15. An apparatus for communication comprising:
a memory device; and
a processing circuit coupled to the memory device and configured to:
receive a directed synchronization signal;
determine a synchronization signal index associated with the directed synchronization signal;
determine timing for sending uplink control information, wherein the determination of the timing is based on the determined synchronization signal index; and
send the uplink control information at the determined timing.

16. The apparatus of claim 15, wherein the processing circuit is further configured to:
send random access information via a frame.

17. The apparatus of claim 16, wherein the random access information and the uplink control information are sent as frequency division multiplexed orthogonal tones.

18. The apparatus of claim 15, wherein:
the processing circuit is further configured to determine tone locations for the sending of the uplink control information within a frame;
the determination of the tone locations is based on the directed synchronization signal; and
the uplink control information is sent at the tone locations within the frame.

19. The apparatus of claim 15, wherein the sending of the uplink control information comprises transmission of the uplink control information by a user equipment.

20. The apparatus of claim 19, wherein the processing circuit is further configured to:
receive an indication of symbol locations within a frame; and
send the uplink control information at the indicated symbol locations.

21. The apparatus of claim 19, wherein the processing circuit is further configured to:
receive an indication of tone locations within a frame; and
send the uplink control information at the indicated tone locations.

22. The apparatus of claim 19, wherein the processing circuit is further configured to:
determine tone locations based on an identifier of the user equipment; and send the uplink control information at the determined tone locations.

23. The apparatus of claim 15, wherein the uplink control information comprises at least one of: channel quality information, precoding matrix information, a scheduling request, acknowledgement information, or any combination thereof.

24. A method of communication, comprising:
sending a directed synchronization signal;
determining a synchronization signal index associated with the directed synchronization signal;
determining timing for receiving uplink control information, wherein the determination of the timing is based on the determined synchronization signal index; and
receiving the uplink control information at the determined timing.

25. The method of claim 24, where the determined timing denotes at least one of: a symbol index, a sub-frame index, a radio frame index, or any combination thereof.

26. The method of claim 24, where the determined timing comprises symbol locations.

27. The method of claim 24, further comprising:
receiving random access information via a frame.

28. The method of claim 27, wherein the uplink control information and the random access information are received concurrently with each other and exclusive of any other information within the frame.

29. The method of claim 24, further comprising:
sending signals by a base station to assist a plurality of user equipments (UEs) to transmit the uplink control information,
wherein the receiving of the uplink control information comprises receiving, by the base station, the uplink control information from the UEs.

30. The method of claim 24, wherein the receiving of the uplink control information comprises receiving the uplink control information by a base station.

31. The method of claim 24, wherein the uplink control information comprises physical uplink control channel (PUCCH) information.

32. The method of claim 24, wherein the uplink control information comprises scheduling request information.

33. An apparatus for communication comprising:
a memory device; and
a processing circuit coupled to the memory device and configured to:
send a directed synchronization signal;
determine a synchronization signal index associated with the directed synchronization signal;
determine timing for receiving uplink control information, wherein the determination of the timing is based on the determined synchronization signal index; and
receive the uplink control information at the determined timing.

34. The apparatus of claim 33, wherein:
the sending of the uplink control information comprises transmission of the uplink control information by a user equipment; and
the sending of the directed synchronization signals comprises receipt of the directed synchronization signals.

35. The apparatus of claim 34, wherein the processing circuit is further configured to:
send an indication of symbol locations within a frame; and
receive the uplink control information at the indicated symbol locations.

36. The apparatus of claim 33, wherein:
the receiving of the uplink control information comprises receipt of the uplink control information by a base station; and
the sending of the directed synchronization signals comprises transmission of the directed synchronization signals.

37. The apparatus of claim 36, wherein the processing circuit is further configured to:
select symbol locations within a frame for uplink communication; and
send an indication of the selected symbol locations by the base station.

* * * * *